United States Patent [19]
Yamada et al.

[11] Patent Number: 5,444,682
[45] Date of Patent: Aug. 22, 1995

[54] TRACKING CONTROL APPARATUS

[75] Inventors: Shinichi Yamada, Katano; Mitsurou Moriya, Ikoma; Hiroyuki Yamaguchi; Osamu Yamaguchi, both of Hirakata; Yoshihiro Kanda, Osaka; Yasuki Matsumoto, Takarazuka, all of Japan

[73] Assignee: Matsushita Electric Industrial Co., Ltd., Kadona, Japan

[21] Appl. No.: 301,001

[22] Filed: Sep. 6, 1994

[30] Foreign Application Priority Data

Sep. 7, 1993 [JP] Japan .................................. 5-221794
Feb. 10, 1994 [JP] Japan .................................. 6-016314

[51] Int. Cl.⁶ ........................................... G11B 5/86
[52] U.S. Cl. ..................................... 369/32; 369/44.26
[58] Field of Search ................... 369/32, 44.28, 44.26, 369/44.27, 44.29, 275.4, 275.3, 51, 54, 58, 47, 124

[56] References Cited

U.S. PATENT DOCUMENTS

| | | | |
|---|---|---|---|
| 4,607,358 | 8/1986 | Maeda et al. | 369/32 |
| 4,751,695 | 6/1988 | Kaku et al. | 369/44.26 |
| 4,773,053 | 9/1988 | Gottfried | 369/13 |
| 5,033,037 | 7/1991 | Yanagi | 369/32 |
| 5,077,716 | 12/1991 | Takeda et al. | 369/32 |
| 5,134,601 | 7/1992 | Greenwell et al. | 369/44.26 |
| 5,150,347 | 9/1992 | Yanagi | 369/44.37 |
| 5,199,022 | 3/1993 | Suzuki et al. | 369/13 |
| 5,214,635 | 5/1993 | Satoh et al. | 369/44.26 |
| 5,311,490 | 5/1994 | Matoba et al. | 369/44.26 |

*Primary Examiner*—Georgia Y. Epps
*Assistant Examiner*—Tan Dinh
*Attorney, Agent, or Firm*—Cushman, Darby & Cushman

[57] ABSTRACT

In a tracking control apparatus of a recording and reproducing apparatus for an optical disk, information is recorded in groove tracks and land tracks of the optical disk and address information is recorded in an address area arranged to each of the groove tracks and the land tracks, a control signal corresponding to a positional deviation between a light beam spot and a track is derived on the basis of light reflected from the optical disk, and hence an address period in which the light beam spot traces the address area is derived. When the light beam spot traces the land track, a tracking operation is performed by a control signal which is invert in polarity to that of groove track, and when the light beam spot traces the address area, the tracking control is performed by a signal of the same polarity as that of the groove track.

19 Claims, 32 Drawing Sheets

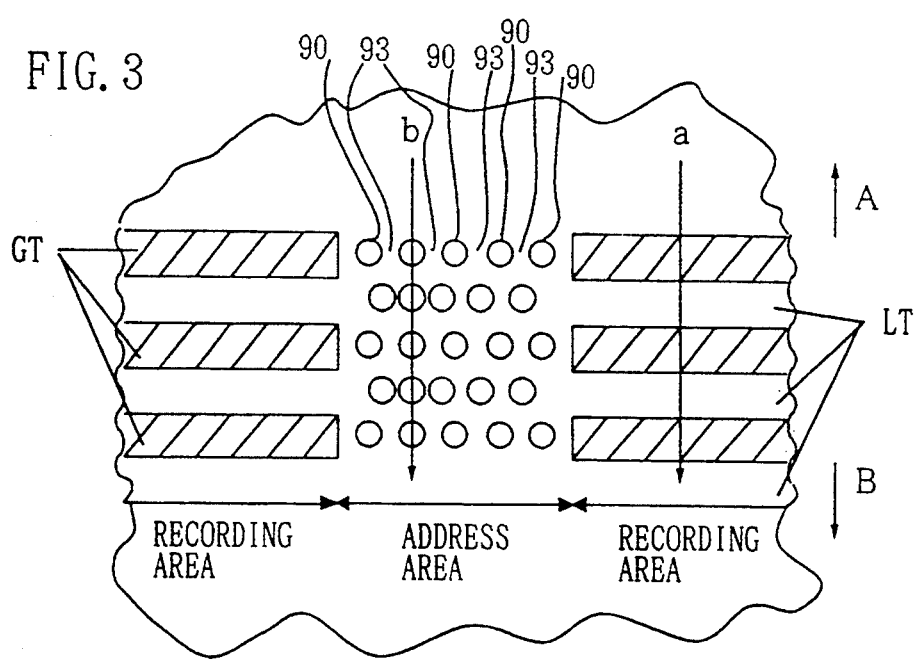
FIG. 3
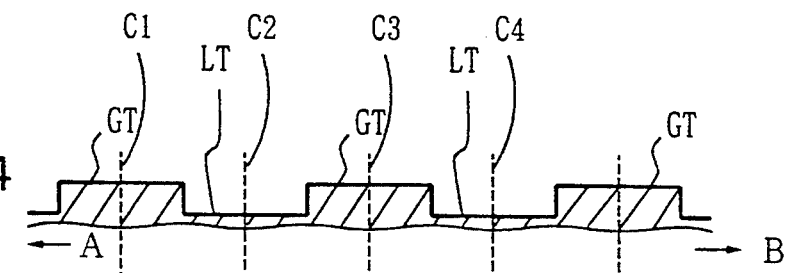
FIG. 4 (a)
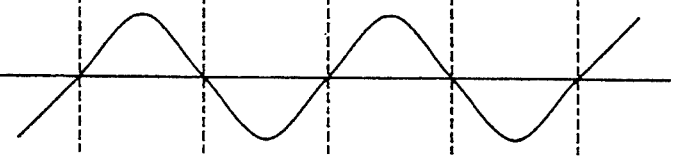
FIG. 4 (b)
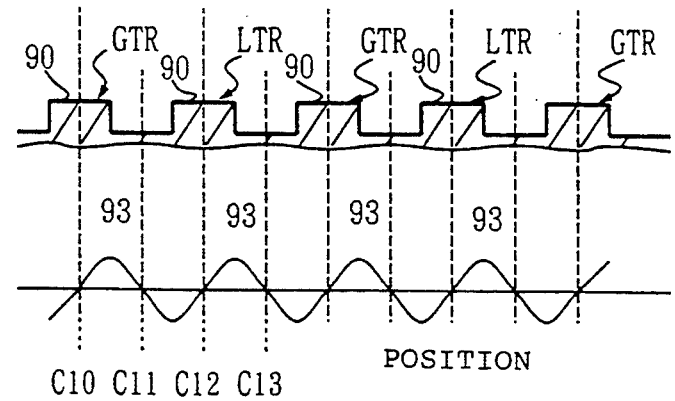
FIG. 4 (c)
FIG. 4 (d)

FIG. 27
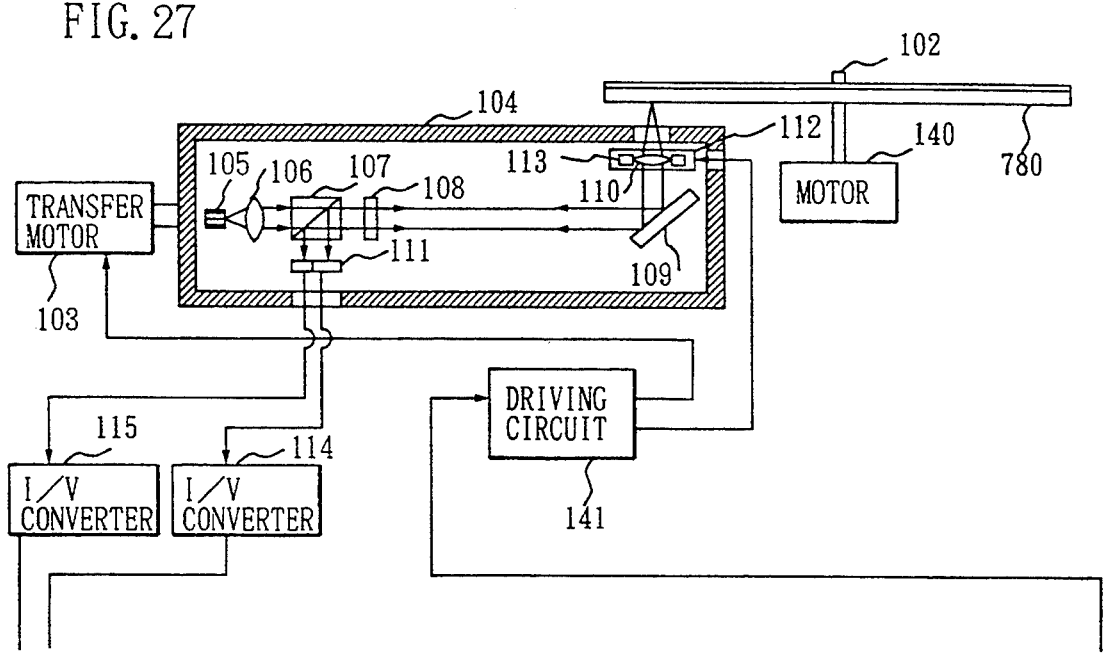
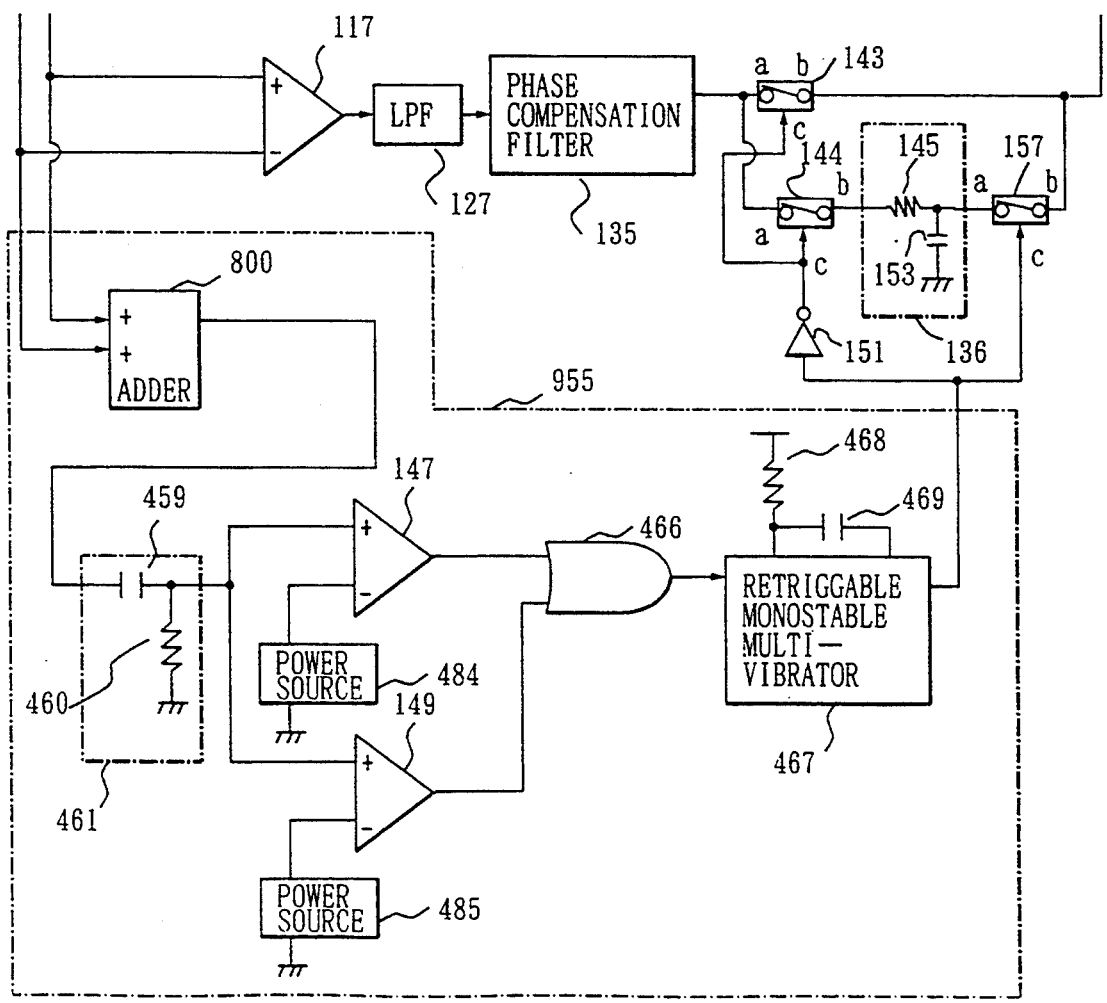

FIG. 29A
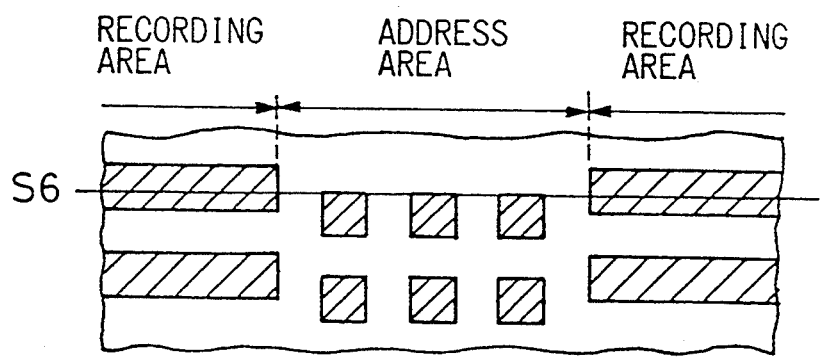
FIG. 29B1
FIG. 29B2
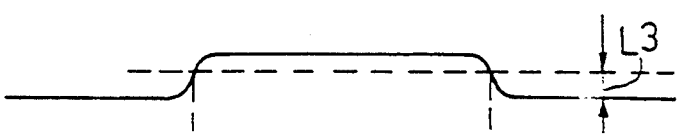
FIG. 29B3
POSITION

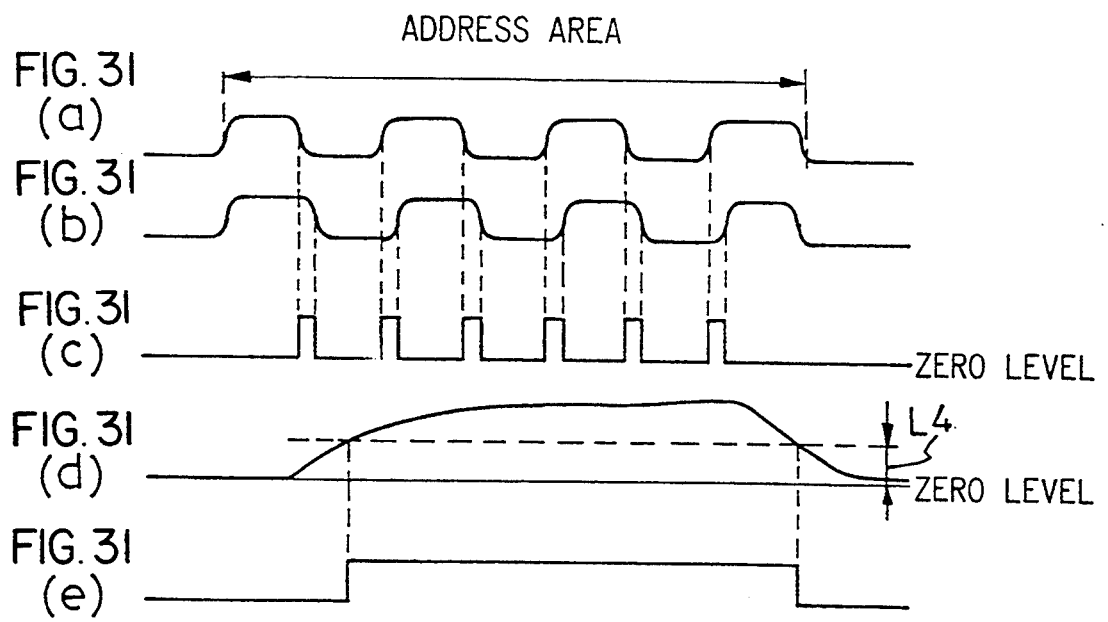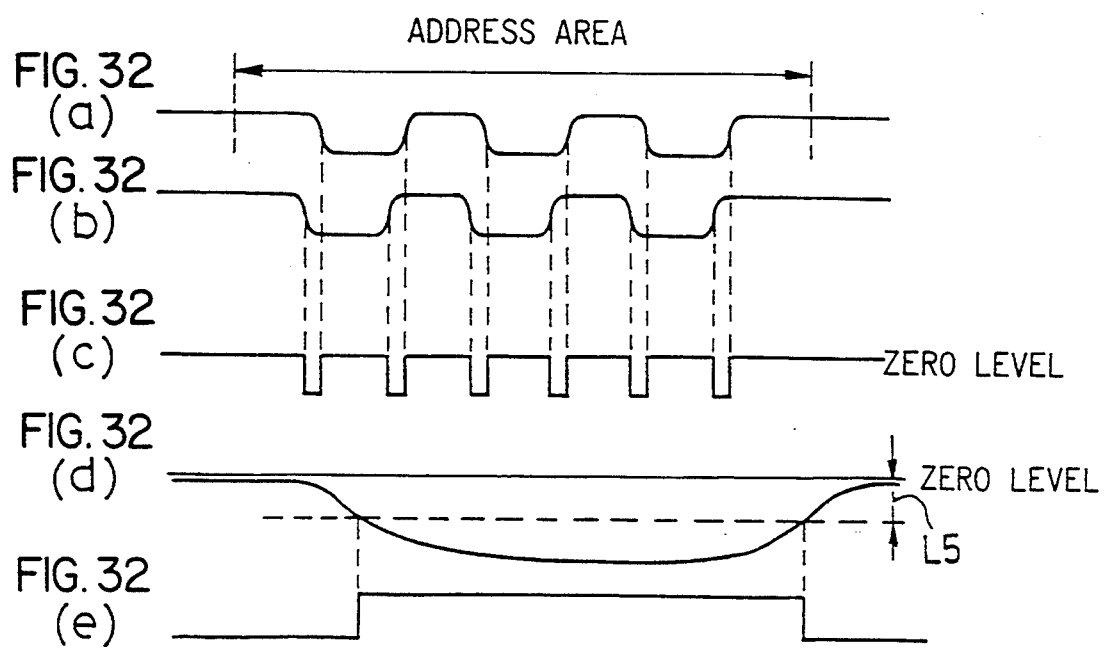

TRACKING CONTROL APPARATUS

FIELD OF THE INVENTION AND RELATED ART STATEMENT

1. Field of the Invention

The present invention relates to a tracking control apparatus of an optical disk recording and reproducing apparatus for recording and reproducing information on an optical disk having plural tracks by applying a converged light beam.

2. Description of the Related Art

In a general optical disk recording and reproducing apparatus, a light beam emitted from a light source such as a semiconductor laser is converged by a conversion lens and is applied to an optical disk rotating at a predetermined revolution speed. Information is recorded on the optical disk and is reproduced therefrom with the light beam.

An enlarged fragmentary perspective view of an example of the conventional optical disk is shown in FIG. 34. A plurality of raised tracks 1 of 0.6 μm in width and 1.6 μm in pitch are disposed on the optical disk 100 in a manner of a spiral or concentric circles. A mark part 2 representing an "address" of each track is formed in the tracks 1 with concave parts 3 and convex parts 4. Moreover, a recording layer (not shown) of phase change material for optical recording is formed on the surface of the disk 100 by a spattering method, for example. In order to record the information on the optical disk 100, focusing control is performed so that a light beam spot is focused on the recording layer, and tracking control is also performed so that the light beam spot is positioned on a target track 1. An intensity of the light beam spot is modulated in compliance with information to be recorded. Consequently, a reflectance of the recording layer is changed, and the information is recorded by the change. In order to reproduce the recorded information, the intensity of the light beam spot is kept to a weaken constant value and the focusing control and the tracking control are performed in a manner similar to the recording operation, and a change of the intensity of reflected light is detected in accordance with the reflectance of the recording layer.

A "focus error signal" representing a deviation of the focused position of the light beam spot from the recording layer is detected by a detecting method generally called an astigmatism method. The focus control is accomplished by driving the conversion lens in the perpendicular direction to the recording surface of the optical disk 100 in compliance with the focus error signal.

A "tracking error signal" representing a positional deviation of the light beam spot from a track is detected by a detecting method generally called a push-pull method. The tracking control is accomplished by driving the conversion lens in the perpendicular direction to the track in compliance with the tracking error signal.

In the push-pull method, a light reflected and diffracted by the track 1 on the optical disk 100 is detected by two sensing parts placed symmetrically with respect to the center of the track, and a positional deviation is detected on the basis of a difference of both the detected values. When the light beam spot is applied to the center of the track, symmetrical distribution of the reflected and diffracted light is realized on the two light sensing parts, and the outputs detected by both the light sensing parts are identical with each other. On the other hand, when the position of the light beam spot does not coincide with the center of the track, the two detected outputs are different from each other.

An example of the tracking error signal by the push-pull method is shown in FIG. 35. When the light beam spot is positioned at the center C1, C2 or C3 of the tracks 1, the level of the tracking error signal is zero. On the other hand, when the light beam spot is shifted from the center C1, C2 or C3 toward an inner side of the disk shown by an arrow B, the tracking error signal becomes a positive value, and when the light beam spot is shifted toward an outer side shown by an arrow A (circumferential direction), the tracking error signal becomes a negative value. When the light beam spot is positioned at the center of neighboring two tracks 1, the tracking error signal is zero. On the other hand, when the light beam spot is shifted toward the inner side B from the center of the neighboring two tracks 1, the tracking-error signal becomes a negative value, and when the light beam Spot is shifted toward the outer side A, the tracking error signal becomes a positive value. Namely, the polarity of the tracking error signal is inverted in the vicinity of the center of the track 1 and the center of neighboring two tracks 1. In the region of the address, the tracking error signal is generated at the convex parts 4, but is not generated at the concave parts 3. When the light beam spot is removed from the tracks, the tracking error signal becomes zero at the concave parts 3.

A frequency band width required to the tracking control system is several KHz and below in general. Therefore, the tracking error signal is inputted to a low-pass filter having a cutoff frequency of several ten KHz, and the tracking control is performed on the basis of the output signal of the low-pass filter. The concave parts 3 and convex parts 4 for the address are recorded at a several MHz of pulses in general. Therefore, when the tracking error signal is applied to the low-pass filter of the cutoff frequency of the several ten KHz, the level of the output signal of the low-pass filter is reduced in the address region, and an output signal representing a deviation of the light beam spot from the track can be obtained.

Recently, increasing a capacity of a recording medium and miniaturization of the recording medium are eagerly required. A recording method by which information is not only recorded on the tracks 1 of the optical disk, but also is recorded between neighboring two tracks 1 is proposed in order to fulfill the requirement. As mentioned above in the push-pull method, since the polarity of the tracking error signal on the concave part is inverse to that on the convex part, the light beam spot may be controlled to be positioned on the concave part by switching the polarity of the tracking error signal. Hereinafter, the convex part is designated by a "groove track" 1B, and the concave part is designated by a "land track" 1A.

In a high density optical disk, provision of address parts 2 in both the groove track 1B and the land track 1A is proposed. In this type, the address part of the land track 1A is also formed by convex parts and concave parts in a similar manner of the address part of the groove track 1B. On the other hand, provision of a common address part at a middle position between the groove track 1B and the land track 1A is also proposed.

In the optical disk of which the address part of the track is disposed to both the groove track 1B and the land track 1A, in the case that the tracking control is performed by switching the polarity of the tracking error signal so that the light beam spot is positioned on the land track 1A, the polarity of the tracking error signal on the address part of the land track 1A is inverse to the polarity of the tracking error signal at other parts than the address part of the land track 1A. Consequently, the tracking control on the address part of the land track 1A becomes unstable in the conventional tracking control apparatus.

On the other hand, in the optical disk provided with the common address part between the groove track 1B and the land track 1A, since the center of the concave part the and convex part of the address part is shifted from the center of the groove track 1B or the land track 1A, an offset is generated in the tracking error signal of the address part. Therefore, in the conventional tracking control apparatus, the position of the light beam spot deviates from the center of the track in the address part.

Moreover, in the conventional tracking control apparatus, when the light beam spot is moved to a neighboring track in the address part, the tracking control operation becomes unstable after movement of the light beam spot in both the above-mentioned types.

OBJECT AND SUMMARY OF THE INVENTION

An object of the present invention is to provide a tracking control apparatus of which a stable tracking operation is realized in an address area in a high density optical disk for recording information in groove tracks and land tracks.

The tracking control apparatus of the present invention uses a disk which is provided with address information parts with respect to both groove tracks and land tracks for recording information, and comprises moving means for moving a light beam spot in a substantially perpendicular direction to the direction along the groove tracks and land groove of the disk, control means for controlling the moving means so that the light beam spot traces a track in compliance with a control signal responding to a positional deviation of the light beam spot with respect to the track detected by a reflected light or a transmitted light from the disk, and address period signal generation means for generating an address period signal, and when the light beam spot is made to trace the land track, the control means sets the polarity of the control signal to the same polarity as the case tracing the groove track during the address period which is decided by the address period signal generation means, and in other periods, the polarity of the control signal is made to an inverse polarity with respect to the case tracing the groove track.

By the above-mentioned configuration, when the signal is inputted from the address period signal generation means in the state that the control means is operated so that the light beam spot traces the land track, the control means is operated on the basis of the signal inverted in the polarity of the control signal. Therefore, a stable tracking control is realized in the address area of the land track.

Moreover, the tracking control apparatus of the present invention uses a scheme of disk having a common address information part at a center between the groove track and the land track, and comprises moving means for moving the light beam spot in a substantially perpendicular direction to the direction along the groove tracks and the land tracks of the disk, control means for controlling the moving means so that the light beam spot traces the track in compliance with the control signal corresponding to a positional deviation between the light beam spot and the track detected by the reflected light or the transmitted light from the disk, address period signal generation means for generating the address period signal and holding means for holding the control signal of the control means during the address period which is decided by the address period signal generation means.

By the above-mentioned configuration, in the state that the control means is operated so that the light beam spot traces the land track or the groove track, when the address period signal is inputted from the address period signal generation means, the control means holds the control signal, and controls the moving means on the basis of the held value. Therefore, the position of the light beam spot does not deviate from the center of the track in the address area.

Moreover, the tracking control apparatus of the present invention uses the disk having the common address information part at the part between the groove track and the land track, and comprises moving means for moving the light beam spot in a substantially perpendicular direction to the direction along the tracks of the disk, control means for controlling the moving means so that the light beam spot traces the track in compliance with the control signal corresponding to the positional deviation between the light beam spot and the track detected by a reflected light or a transmitted light from the disk, address period signal generation means for generating an address period signal on the basis of the control signal, and jumping control means for moving the light beam spot to a neighboring track by controlling the moving means, and the jumping control means is operated out of the period set by the address period signal generated by the address period signal generation means.

According to the above-mentioned configuration, the jumping control means for moving the light beam spot to the neighboring track is operated out of the address area. Therefore, a stable tracking control is realized.

While the novel features of the invention are set forth particularly in the appended claims, the invention, both as to organization and content, will be better understood and appreciated, along with other objects and features thereof, from the following detailed description taken in conjunction with the drawings.

BRIEF EXPLANATION OF THE DRAWINGS

Hereafter, embodiments of the present invention are described with reference to FIG. 1 through FIG. 33.

FIG. 3 is an enlarged fragmentary plan view of tracks of the optical disk in the first embodiment;

FIG. 4 is a diagram illustrating tracking error signals in the first embodiment;

FIG. 27 is a block diagram of a tracking control apparatus of a ninth embodiment of the present invention;

FIG. 29A is an enlarged fragmentary plan view of an optical disk;

FIGS. 29B(1-3) is a diagram illustrating waveforms in operation of the tenth embodiment;

FIG. 31 is a diagram illustrating waveforms in operation of the eleventh embodiment;

FIG. 32 is a diagram illustrating waveforms in operation of the eleventh embodiment;

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1:
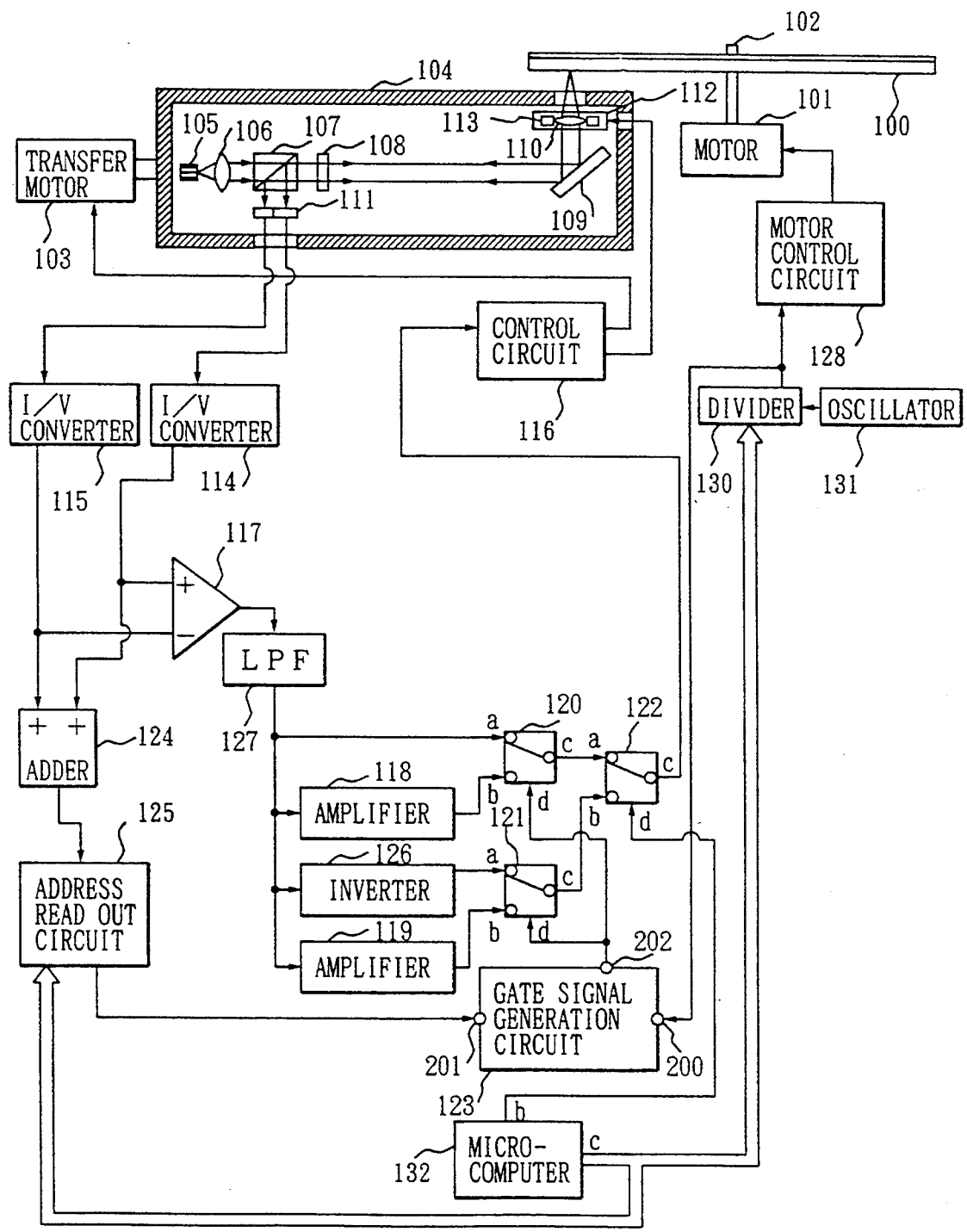
FIG. 1 is a block diagram of a tracking control apparatus of a first embodiment of the present invention.

FIG. 1 is a block diagram of the tracking control apparatus of a first embodiment of the present invention. Referring to FIG. 1, a disk 100 of an optical type mounted on a rotating shaft 102 of a motor 101 is provided with address areas for "groove tracks GT" and "land tracks LT" which are "tracks" for recording information as shown in FIG. 3. In the address area, address information is prerecorded with convex parts 90 and concave parts 93. The motor 101 is controlled by a motor control circuit 128 and a divider 130 so as to rotate at a predetermined revolution speed. The revolution speed is set by the microcomputer 132.

A transfer stage 104 of a known type disposed under the disk 100 comprises a light source 105 such as a semiconductor laser, a coupling lens 106, a polarization beam splitter 107, a ¼ wave plate 108, a total reflector 109, a photo-detector 111, an actuator 112, a conversion lens 110 and a tracking coil 113. The transfer stage 104 is moved in the radial direction of the disk 100 by a transfer motor 103 such as a linear motor.

A light beam emitted by the light source 105 is collimated by the coupling lens 106, and is reflected by the total reflector 109 through the polarization beam splitter 107 and the ¼ wave plate 108. Subsequently, the light beam is converged by the conversion lens 110 and is applied to the recording surface of the disk 100.

Light reflected by the recording surface of the disk 100 passes the conversion lens 110 and is reflected by the total reflector 109. Subsequently, the light passes the ¼ wave plate 108 and is reflected by the polarization beam splitter 107, and is applied to the photo-detector 111 having two sensing areas. The conversion lens 110 is mounted on a movable part of the actuator 112. The movable part comprises a tracking coil 113 which is driven by a magnet (not shown) fixed on the actuator 112.

When a current is supplied to the tracking coil 113, the conversion lens 110 is moved in the radial direction of the disk 100, namely traversing the tracks of the disk 100 (right and left direction in FIG. 1). Moreover, the actuator 112 comprises a focusing coil (not shown) for focusing, and when a current is supplied to the focusing coil, the conversion lens 110 is moved in the perpendicular direction to the surface of the disk 100 by an electromagnetic force generated between a magnet and the coil. The conversion lens 110 is controlled so that the light beam spot applied to the disk 100 maintains a predetermined conversion state.

The reflected light from the disk 100 is detected by the two sensing areas of the photosensor 111, and respective detected currents are output therefrom. The two detected currents are applied to respective I/V converters 114 and 115, and are converted to voltages corresponding to the current values by the respective I/V converters 114 and 115. The voltages are applied to a differential amplifier 117. In the differential amplifier 117, a voltage difference of both the input voltages is derived. The voltage difference is applied to amplifiers 118 and 119 and an inverting amplifier 126 (inverter) having a gain of 1 and a terminal "a" of a switch 120 through a low-pass filter 127.

The optical system illustrated in FIG. 1 forms a known tracking error detection system called a push-pull method in general. The output of the differential amplifier 117 is a "tracking error signal" representing a difference between both positions of the light beam spot and a target track. In the case that the light beam spot is controlled so as to be positioned on a groove track GT, the terminal "c" of the switch 120 is connected to the terminal "a" thereof by an instruction signal from a "gate signal generation circuit" 123, and the terminal "c" of a switch 122 is connected to the terminal "a" thereof by an instruction signal from a "microcomputer" 132. Consequently, the tracking error signal output from the differential amplifier 117 is applied to the actuator 112 through the low-pass filter 127, the switches 120 and 122 and a control circuit 116. The light beam spot is controlled to be positioned on the center of the groove track GT of the disk 100.

Moreover, the tracking error signal is applied to the transfer motor 103 from the control circuit 116, and the transfer stage 104 is moved in the radial direction of the disk 100 so that the center of a movable range of the conversion lens 110 becomes coincident with the center of the target track. The terminal "b" of the switch 120 is connected to the terminal "c" by the instruction signal from the gate signal generation circuit 123 during a period that the light beam spot passes the address area of the groove track GT. The amplifier 118 amplifies the output signal of the low-pass filter 127. This is necessary because the level of the tracking error signal falls on the concave parts and convex parts representing address information in the period that the light beam spot passes the address area of the land track LT. The decrease of the level of the tracking error signal results in decrease of a frequency range of control in the tracking control system. Therefore the decrease of the level must be prevented by the above-mentioned amplifying. The gain of the amplifier 118 is made to correspond to a ratio of a detected level on the address area to a detected level in other area.

Operation of the tracking control apparatus is described hereafter. The tracking control operation is to position the light beam spot to a land track LT. The terminal "a" of the switch 121 is connected to the terminal "c" thereof in compliance with the instruction signal of the gate signal generation circuit 123, and the terminal "b" of the switch 122 is connected to the terminal "c" thereof in compliance with the instruction signal of the microcomputer 132. Consequently, the tracking error signal output from the differential amplifier 117 is applied to the actuator 112 through the low-pass filter 127, the inverter 126, the switches 121 and 122 and the control circuit 116. The polarity of the tracking error signal of the land track LT is inverse to the polarity of the tracking error signal of the groove track GT with respect to the same shift direction between the track and the light beam spot. Therefore, the polarity of the tracking error signal is inverted by the inverter 126. Consequently, the light beam spot is controlled so as to position on the center of the land track LT. The tracking error signal inverted in polarity is applied to the transfer motor 103 from the control circuit 116, and the transfer stage 104 is controlled so that the center of the movable range of the conversion lens 110 is coincident with the center of a target track of the optical disk 100. In the period that the light beam spot passes the address area of the land track LT, the terminal "b" of the switch 121 is connected to the terminal "c" thereof in compliance with the instruction signal of the gate signal generation circuit 123. Consequently, the output of the amplifier 119 is applied to the terminal "b" of the switch 122.

The output signal of the low-pass filter 127 is amplified by the amplifier 119. This is necessary because the detected level of the tracking error signal decreases on the concave part and the convex part representing the address information during the period in which the light beam spot passes the address area of the land track LT. The decrease of the detected level is compensated by amplifying as mentioned above, and thus the frequency range of control in the tracking control system is made constant. Moreover, in the land track LT, since the polarity of the tracking error signal in the address area is inverse to the polarity thereof in other area, the polarity of the detected signal is inverted by the above-mentioned inverter 126, and thereby the light beam spot is controlled to pass the center of the address area of the land track LT.

The outputs of the I/V converters 114 and 115 are inputted to an adder 124. The inputted signals are added in the adder 124, and an added signal is applied to an address readout circuit 125. The output of the adder 124 corresponds to a sum of the amount of reflected light from the disk 100. Therefore, a variation of the output signal of the adder 124 represents address information and recorded information in the disk 100.

The address readout circuit 125 reads out the information of the address area in accordance with a revolution speed setting signal applied from the microcomputer 132 and the output signal of the adder 124. A track number and a sector number are recorded in the address area in advance. When the information of the address area of which the sector number is zero is read out by the address read out circuit 125, a pulse signal is output from the address read out circuit 125 at the end of the address area and is applied to the terminal 201 of the gate signal generation circuit 123.

The microcomputer 132 sends the revolution speed setting signal to the divider 130 and the address readout circuit 125. The output signal of an oscillator 131 is divided by the divider 130 and is applied to the motor control circuit 128.

Figure 5:
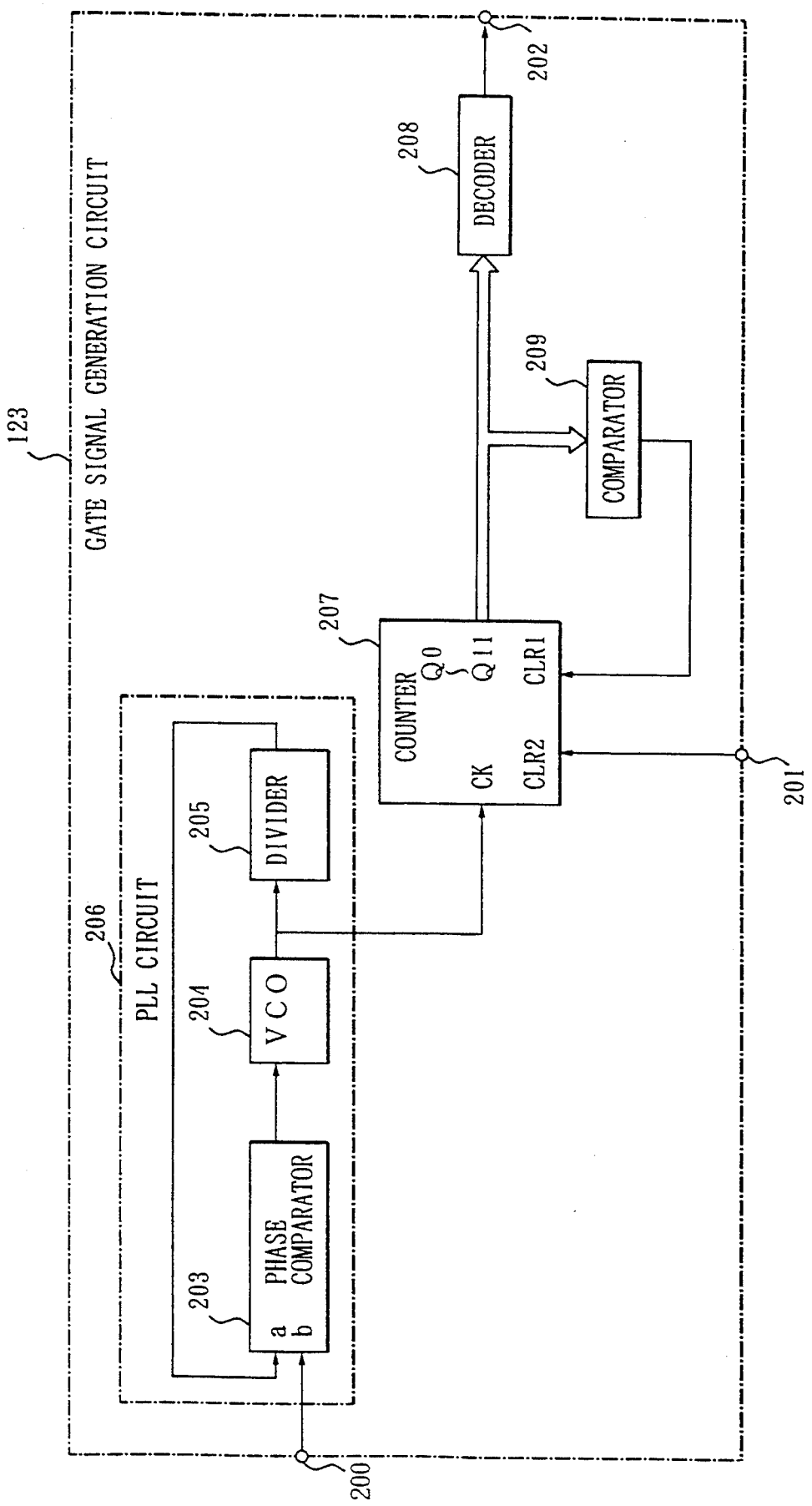
FIG. 5 is a block diagram of a gate signal generation circuit in the first embodiment.

FIG. 5 is a block diagram of the gate signal generation circuit 123. The gate signal generation circuit 123 comprises a PLL circuit (phased locked loop circuit) 206 which generates a signal of N times in frequency in synchronism with the output signal of the divider 130. Moreover, the gate signal generation circuit 123 comprises counter 207 for counting clock signals output from a VCO (voltage controlled oscillator) 204 of the PLL circuit 206, which counter 207 is reset by a pulse signal representing the end of the address area having the sector number of zero output from the address readout circuit 125. Therefore, the counted value of the counter 207 corresponds to a rotating angle of the disk 100 of which a sector of the sector number zero is made to a reference sector. A gate signal representing the address area of the disk 100 is generated on the basis of the counted value of the counter 207, and is applied to the control terminals "d" of the switches 120 and 121 through a terminal 202. The gate signal is set to a low level in the address area. The gate signal corresponds to an "address period signal" representing an address period. The gate signal generation circuit 123 corresponds to an "address period signal generation means". The gate signal generation circuit 123 will be described in detail hereinafter.

Figure 2A:
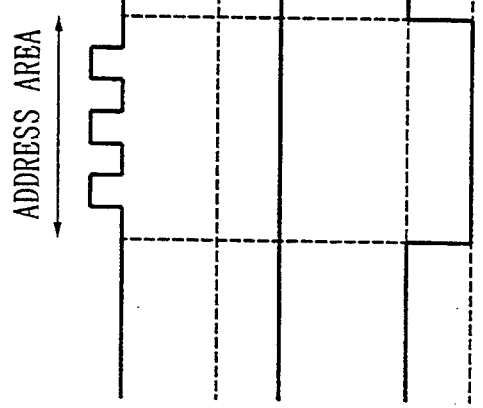
FIG. 2A and FIG. 2B are waveforms of reproduced signals in the first embodiment.
Figure 2B:
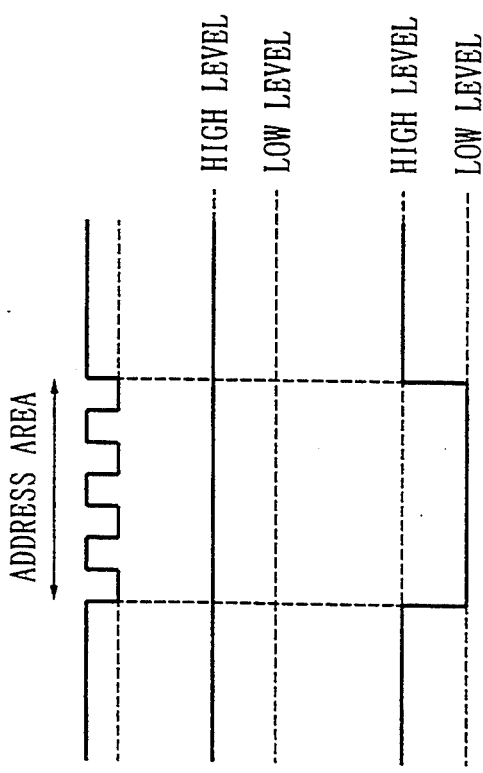

Operation of the tracking control apparatus shown in FIG. 1 is elucidated with reference to FIG. 2A and FIG. 2B. FIG. 2A is a diagram concerning the groove track GT, and FIG. 2B is a diagram concerning the land track LT. Waveforms (a) in FIG. 2A and FIG. 2B represent arrangements of convex parts and concave parts in the address area on the disk 100. The right and left directions in both figures are parallel to the tracks. Waveforms (b) in FIG. 2A and FIG. 2B illustrate output signals at the terminal "b" of the microcomputer 132, and waveforms (c) illustrate output signals at the terminal 202 of the gate signal generation circuit 123. The switches 120, 121 and 122 are structured so that the respective terminals "a" are connected to the terminals "c" when the level at the control terminal "d" is a high level.

When the groove track GT is traced, the terminal "a" of the switch 122 is connected to the terminal "c" because the control terminal "d" is the high level (waveform (b) in FIG. 2A). Moreover, the control terminal "d" of the switch 120 is a low level in the address area (waveform (c) in FIG. 2A), and thus the terminal "b" is connected to the terminal "c". Therefore, the tracking error signal is amplified by the amplifier 118. Consequently, decrease of the detected level of the tracking error signal in the address area is compensated, and the frequency range of control in the tracking control system is maintained to a predetermined value.

When the land track LT is traced, since the control terminal "d" of the switch 122 is the low level (waveform (b) in FIG. 2B), the terminal "b" is connected to the terminal "c". Consequently, the polarity of the tracking error signal to be inputted to the control circuit 116 is inverted with respect to that of the groove track GT, and thus the light beam spot is controlled to trace the land track LT. Moreover, since the level at the control terminal "d" of the switch 121 is the low level in the address area (waveform (c) in FIG. 2B), the terminal "b" is connected to the terminal "c". Therefore, the tracking error signal is amplified by the amplifier 119. Consequently, the frequency range of control in the tracking control system is maintained to a predetermined value in the address area. The light beam spot is controlled so as to pass the center of the address area because the polarity of the tracking error signal inputted to the control circuit 116 is temporarily inverted.

FIG. 3 is a diagram illustrating arrangement of tracks on the disk 100 which is used in the first embodiment of the present invention. Hatched parts represent the groove tracks GT, and parts between neighboring two groove tracks GT are the land tracks LT. Address marks comprising convex parts 90 and concave parts 93 are arranged for both the groove tracks GT and the land tracks LT. Relation between the tracking error signal and the groove tracks GT or the land tracks LT in the disk is shown in FIG. 4.

Referring to FIG. 4, a diagram (a) illustrates a cross-section of the groove tracks GT and the land tracks LT in a recording area. The direction of the tracks is perpendicular to the paper surface in FIG. 4. An arrow A indicates the direction toward a point on the circumference of the disk, and an arrow B indicates the direction toward the center of the disk. A waveform (b) illustrates the tracking error signal in the case that the light beam spot traverses the land tracks LT and the groove tracks GT in the direction of an arrow "a" in FIG. 3. A diagram (c) illustrates a cross-section of the groove track region GTR and the land track region LTR in the address area in FIG. 3. A waveform (d) illustrates the tracking error signal in the case that the light beam spot traverses the groove track region GTR and the land track region LTR in the direction of an arrow "b" in FIG. 3. When the light beam spot traverses in the direction of the arrow "b", the light beam traverses on the convex in the address area.

The tracking error signal becomes zero at respective centers C1, C2, C3, C4 . . . of the groove tracks GT and the land tracks LT as shown by the waveform (b). The tracking error signal becomes a positive value when the light beam spot is shifted to the direction B from the centers C1, C3 of the groove tracks GT. On the other hand, the tracking error signal becomes a negative value when the light beam spot is shifted to the direction B from the centers C2, C4 of the land tracks LT. Namely, change in polarity of the tracking error signal with respect to the groove track GT is inverse to the change in polarity of the tracking error signal with respect to the land track LT.

The tracking error signal shown by the waveform (d) becomes zero at the centers C10, C11, C12 . . . of the convex parts 90 and respective concave parts 93 in the address area, and becomes a positive value when the light beam spot is shifted to the direction B from the center of the convex parts 90. On the other hand, the tracking error signal becomes a negative value when the light beam spot is shifted to the direction B from the center of the concave parts 93. The frequency of the tracking error signal in the waveform (d) is twice of that of the waveform (b). Therefore, when a high frequency component of the tracking error signal is interrupted by the low-pass filter 127, the detected level of the tracking error signal decreases.

Operation of the gate signal generation circuit 123 is described in detail hereinafter.

The disk 100 in the first embodiment has sectors of the same length in one track, and a track number and a sector number are recorded in the address area placed at the head of each sector. The disk rotates by one revolution every inputting 36 pulses to the motor control circuit 128. The frequency of the output signal of the divider 130 is 1080 Hz, and the revolution speed of the motor 101 is 1800 rpm.

FIG. 5 is the block diagram of the gate signal generation circuit 123.

The gate signal generation circuit 123 comprises the PLL circuit 206, and the PLL circuit 206 is composed of a phase comparator 203, a VCO 204 and a divider 205. The divider 205 divides the output signal of the VCO 204 into a frequency of one-hundredths, and the divided signal is applied to the terminal "a" of the phase comparator 203. In the phase comparator 203, the phase of the pulse signal inputted to the terminal "b" through the terminal 200 is compared with that of the signal inputted to the terminal "a", and a phase difference signal corresponding to the phase difference between both the signals is generated. The phase difference signal is applied to the VCO 204. Consequently, in the VCO 204, the signal divided by the divider 205 is controlled so as to synchronize with the pulse signal inputted from the terminal 200, and thus the phases of both signals are in coincidence with each other. The output of the VCO 204 is in synchronism with the signal inputted from the terminal 200, and the frequency thereof is one hundred times of the input signal. The input signal at the terminal 200 is inputted from the divider 130 and is 1080 Hz. Consequently, the oscillation frequency of the VCO 204 is 108 KHz. The number of clock pulses output from the VCO 204 per one revolution of the disk 100 is 3600 pulses. The output signal of the VCO 204 is applied to the terminal CK of a counter 207.

The counter 207 is a synchronous counter of binary 12 bits, and counting operation and clearing of a counted value are performed at a rise edge of the clock pulse inputted to the terminal CK. In the counter 207, the counted value is represented by Q0 through Q11. The Q0 represents the least significant bit and the Q11 represents the most significant bit. Moreover, when a clock pulse is inputted to the terminal CK in the state of high level at the terminal CLR1, the counted value is reset (clear). The output of the counter 207 is applied to a comparator 209 and a decoder 208.

The comparator 209 outputs a signal of a high level to the terminal CLR1 of the counter 207 when the inputted value reaches 3599 of the number. Namely, the counted value of the counter 207 changes from "0" to "3599", and the counting operation "0" through "3599" is repeated. The number of clock signal output from the VCO 204 during one revolution of the disk 100 is 3600 clocks, and the counted value of the counter 207 corresponds to the revolution angle of the disk 100. For example, when the counted value is zero, the revolution angle is also zero degrees, and when the counted value is 1, the revolution angle is 0.1 degrees, moreover, when the counted value is 3599, the revolution angle is 359.9 degrees.

The terminal 201 is connected to an address readout circuit 125 in FIG. 1, and a pulse signal is inputted to the terminal CLR2 of the counter 207 through the terminal 201 at the end of the address area having the sector number of zero. Consequently, the counted value of the counter 207 becomes zero at the end of the address area of the sector number of zero. A reference position of the revolution angle of the disk designated by the counted value of the counter 207 is the end of the address area of the sector number of zero. The decoder 208 comprises a bit comparator (not shown), and the output thereof is a low level in the state that the counted value of the counter 207 is in the range corresponding to the address area.

In the first embodiment, though the pulse signal is applied to the gate signal generation circuit 123 from the address readout circuit 125 at the end of the address area of the sector number of zero, in the case that the address area is formed with the same interval, the pulse signal may be applied to the gate signal generation circuit 123 every readout operation of the address area. In this case, when the pulse signal is applied to the gate signal generation circuit 123, one gate signal corresponding to a subsequent address area is generated on the basis of the pulse signal. Moreover, in the gate signal generation circuit 123, in the case that the revolution speed of the motor 101 is constant, an oscillator for generating a clock signal of a predetermined frequency may be used in place of the PLL circuit 206.

Figure 6:
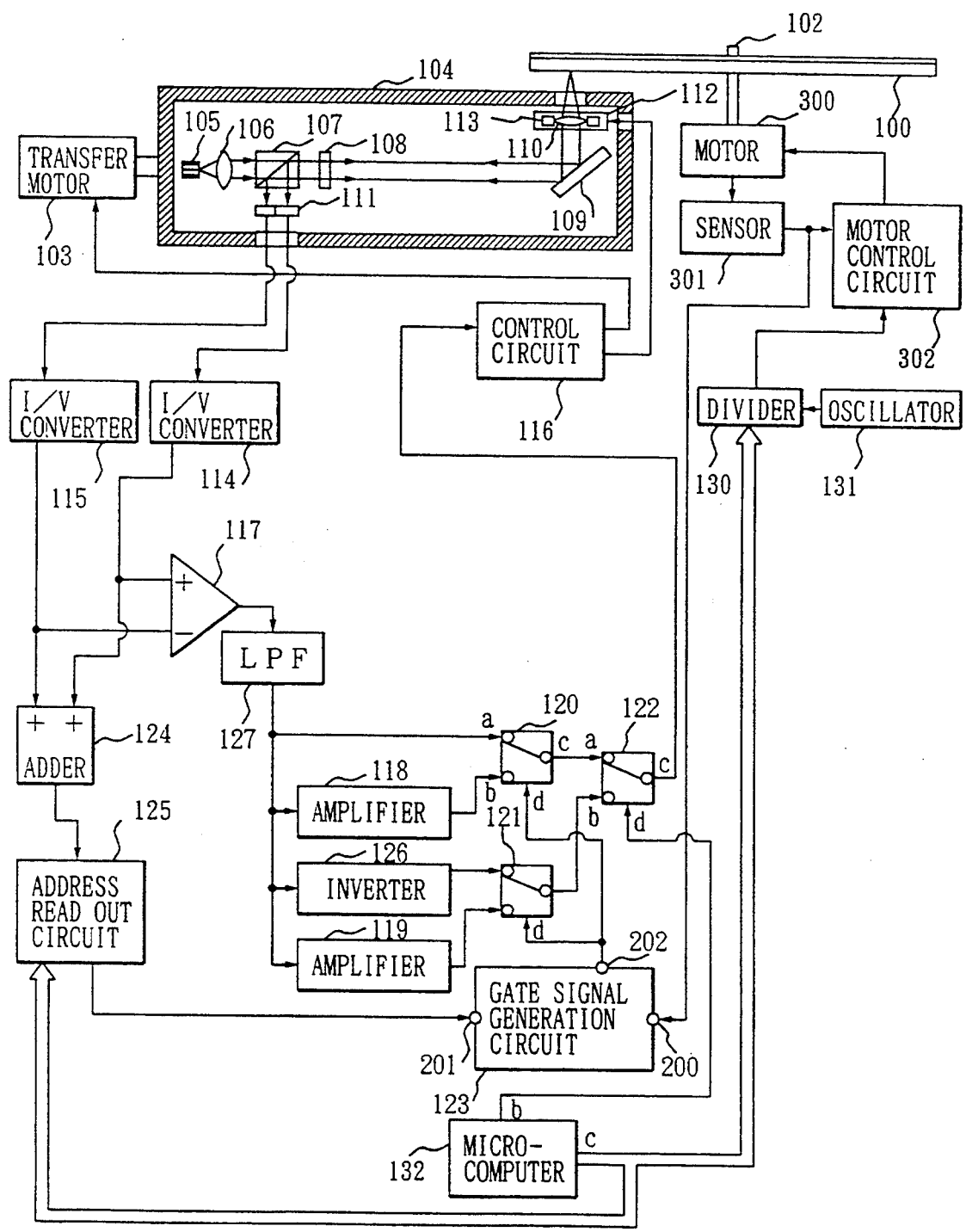
FIG. 6 is a block diagram of a tracking control apparatus of a second embodiment of the present invention.

FIG. 6 is a block diagram of the tracking control apparatus of a second embodiment of the present invention. In FIG. 6, components functioning in the same manner as in the arrangement of FIG. 1 are designated by like numerals as used with corresponding parts shown in FIG. 1 and will not be described. Referring to FIG. 6, a motor 300 is provided with a sensor 301 using a Hall device, for example. The sensor 301 outputs one pulse signal every ten degrees of revolution of the motor 300. Namely, 36 pulse signals are output per one revolution of the motor 300. The output of the sensor 301 is applied to a motor control circuit 302 and the gate signal generation circuit 123. The motor 300 is controlled by the motor control circuit 302 on the basis of the output of the sensor 301 so that the revolution speed corresponds to the output signal of the divider 130. The relation between the output of the divider 130 and the revolution speed of the motor 300 is similar to that of the first embodiment.

In a similar manner to the first embodiment, the frequency of the output signal of the divider 130 is 1080 Hz, and the motor 300 rotates at 1800 rpm. Consequently, the frequency of the output signal of the sensor 301 is 1080 Hz. Namely, the frequency of the input signal of the terminal 200 of the gate signal generation circuit 123 is identical with that of the first embodiment, and thus the operation of the gate signal generation circuit 123 is identical with that of the first embodiment.

According to the second embodiment, since the gate signal generation circuit 123 is operated on the basis of the output signal of the sensor 301, even if the revolution speed of the motor 300 does not exactly follow the output signal of the divider 130. The terminal "b" of the switch 120 is accurately connected to the terminal "c" by the operation of the gate signal generation circuit 123 in the address area.

Figure 7:
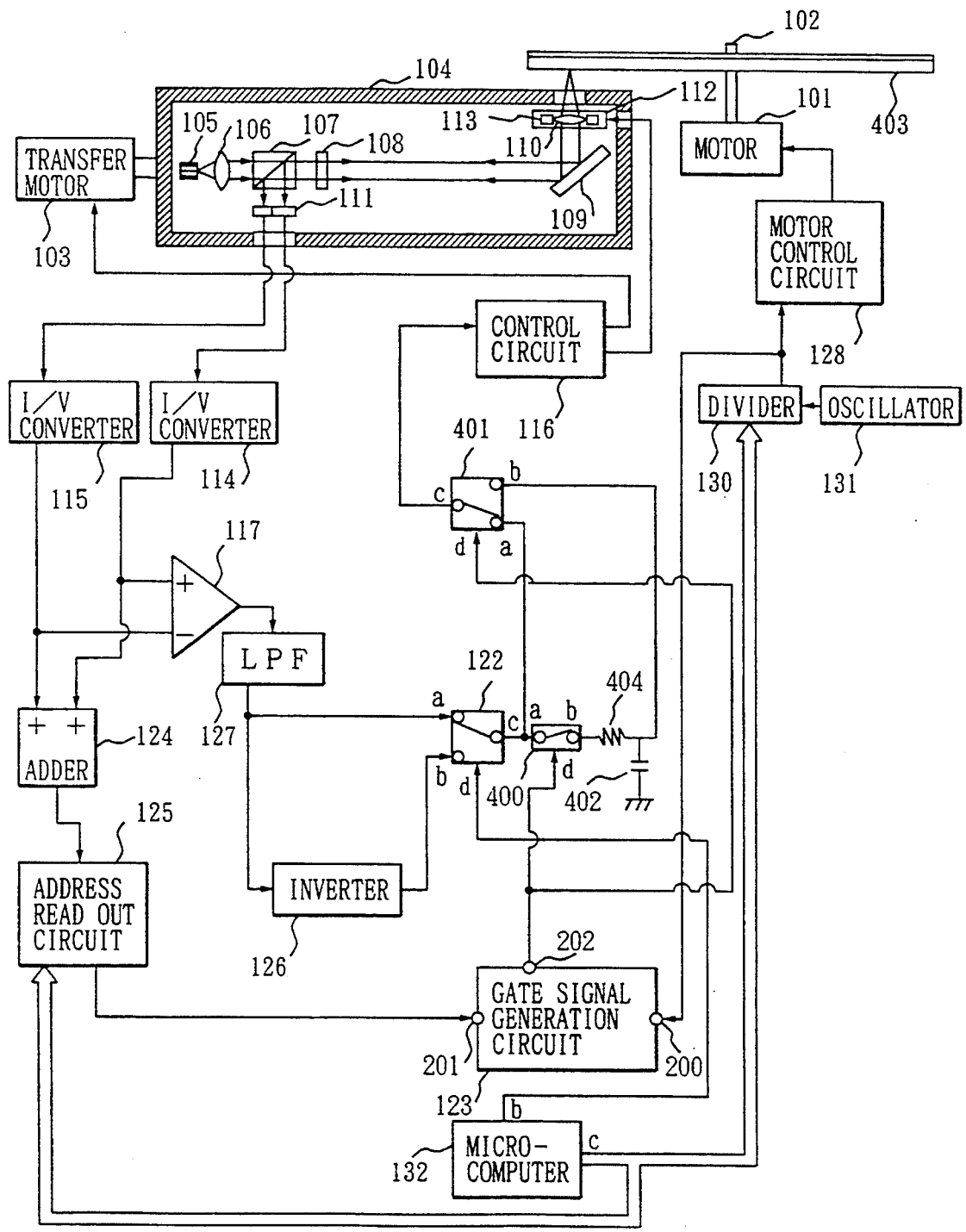
FIG. 7 is a block diagram of a tracking control apparatus of a third embodiment of the present invention.

FIG. 7 is a block diagram of the tracking control apparatus of a third embodiment of the present invention. In FIG. 7, components functioning in the same manner as in the arrangement of FIG. 1 are designated by like numerals as used with corresponding parts shown in FIG. 1 and therefore will not be described.

Figure 8:
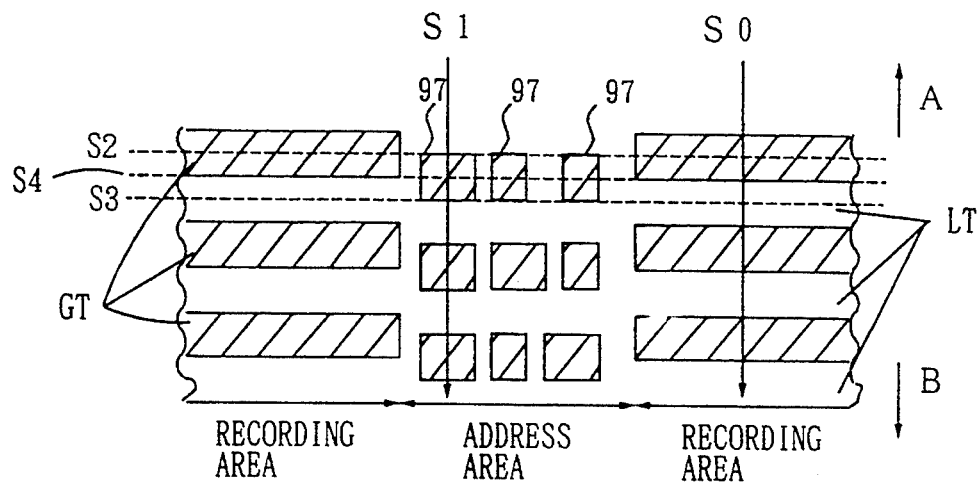
FIG. 8 is an enlarged fragmentary plan view of an optical disk in the third embodiment.
Figure 9A:
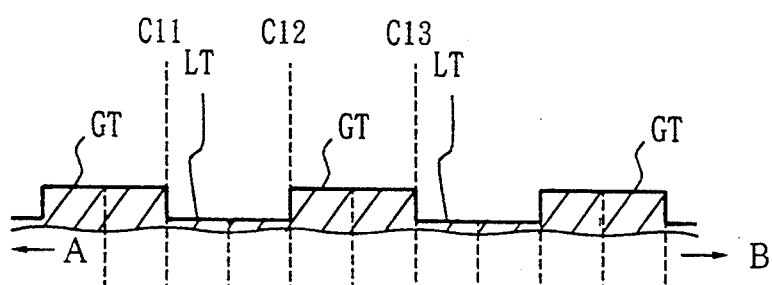
FIG. 9 is a diagram illustrating the tracking error signals of push-pull type in the third embodiment.
Figure 9B:
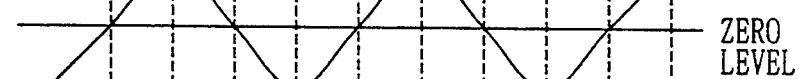
Figure 9C:
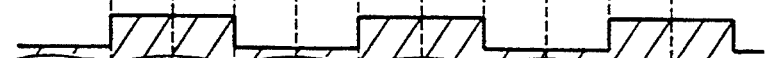
Figure 9D:
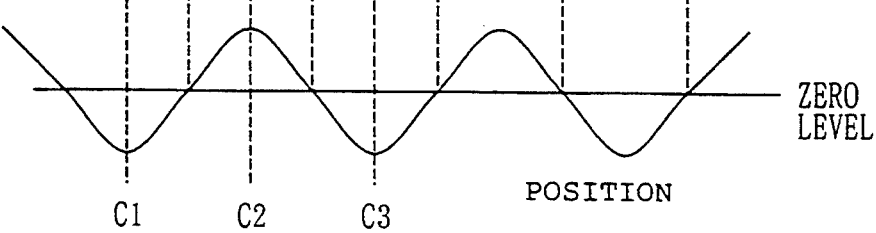

Referring to FIG. 7, a disk 403, as shown in FIG. 8, is provided with a common address mark 97 on a boundary line S4 between the groove track GT and the land track LT. Referring to FIG. 7, the output of the low-pass filter 127 is applied to the terminal "a" of the switch 122 and the inverter 126. The output of the switch 122 is applied to the terminal "a" of a switch 400 and the terminal "a" of a switch 401. The terminal "b" of the switch 400 is connected to a capacitor 402 through a resistor 404. The output signal of the gate signal generation circuit 123 is applied to control terminals "d" of the switches 400 and 401. The switch 400 is disconnected when the control terminals "d" is of a low level, and the terminal "b" of the switch 401 is connected to the terminal "c" thereof when the control terminal "d" is of a low level. The other terminal of the capacitor 402 is connected to ground, and a low-pass filter is formed by the resistor 404 and the capacitor 402. Therefore, when the switch 400 is disconnected, a voltage applied to the low-pass filter composed of the resistor 404 and the capacitor 402 is held by the capacitor 402, and this voltage is applied to the terminal "b" of the switch 401. The gate signal generation circuit 123 is operated in a manner similar to that of the first embodiment. The voltage held by the capacitor 402 is applied to the control circuit 116 in tracking operation of the address area.

Referring to FIG. 8, hatched parts represent convex parts of tracks of the disk 403. A line of the convex parts 97 in the address area is positioned between each other neighboring groove track GT and land track LT so that the center line S4 of the convex parts 97 is located on the center between the center line S2 of the groove track GT and the center line S3 of the land track LT.

Referring to FIG. 9, a diagram (a) illustrates a cross-section of the land tracks LT and the groove tracks GT. A waveform (b) illustrates a tracking error signal in the case that the light beam spot traverses the tracks along an arrow S0 in FIG. 8. The tracking error signal is zero at the centers C1, C2, C3, ... of the groove tracks GT and the land tracks LT, and has a maximum value at the centers C11, C12, C13, ... between the groove tracks GT and the land tracks LT. Moreover, a diagram (c) illustrates a cross-section of the convex parts 97 in the address area. A waveform (d) represents a tracking error signal when the light beam spot traverses the address area along an arrow S1. The tracking error signal is zero at the center of the convex parts 97 and at the central position between neighboring two convex parts 97 in the address area. The central positions (boundary between land track LT and groove track GT) of the groove tracks GT and the land tracks LT correspond to the centers of the convex parts 97 in the address area. When the light beam spot moves along the center line S2 in FIG. 8, as shown by a waveform (a) in FIG. 10, a negative offset D1 is generated in the tracking error signal in the tracing of the address area. Moreover, when the light beam spot moves along the center line S3 in FIG. 8, as shown by a waveform (b) in FIG. 10, a positive offset D2 is generated in the tracking error signal in the tracing of the address area.

In the disk 403 having the common address mark 95 between the groove track GT and land track LT, because the center line S4 of the convex parts 97 of the address area is shifted from the center lines S2 and S3 of the groove track GT and the land track LT, the offset D1 or D2 is generated in the tracking error signal. Consequently, in the tracking control, the position of the light beam spot is deviated from the center line S2 of the groove track GT or the center line S3 of the land track LT in the address area due to the offset D1 or D2. In order to improve this disadvantage, the transfer motor 103 and the tracking coil 113 are driven by the voltage held by the capacitor 402 in the address area, and deviation of the light beam spot from the center line S2 of the groove track GT or the center line S3 of the land track LT is prevented.

In the tracking control of which the light beam spot traces the groove track GT, the terminal "a" of the switch 122 is connected to the terminal "c" thereof by an instruction signal of the microcomputer 132, and the terminal "a" of the switch 401 is connected to the terminal "c" by an instruction signal of the gate signal generation circuit 123. Consequently, the tracking error signal output from the differential amplifier 117 is applied to the actuator 112 through the low-pass filter 127, switch 122, switch 401 and control circuit 116. And thereby the light beam spot is controlled to trace the center line S2 of the groove track GT on the disk 403. Moreover, the switch 400 is disconnected and the terminal "b" of the switch 401 is connected to the terminal "c" by the instruction signal of the gate signal generation circuit 123 in the period in which the light beam spot passes the address area. Consequently, the tracking error signal held by the capacitor 402 is applied to the control circuit 116.

On the other hand, in such tracking control that the light beam spot traces the land track LT, the terminal "b" of the switch 122 is connected to the terminal "c" in compliance with the instruction signal of the microcomputer 132, and the terminal "a" of the switch 401 is connected to the terminal "c" by the instruction signal of the gate signal generation circuit 123, and the switch 400 is closed. Consequently, the tracking error signal output from the differential amplifier 117 is applied to the actuator 112 through the low-pass filter 127, inverter 126, switch 122, switch 401 and control circuit 116. The switch 400 is disconnected and the terminal "b" of the switch 401 is connected to the terminal "c" by the instruction signal of the gate signal generation circuit 123 in the period in which the light beam spot passes the address area. Consequently, the tracking error signal held by the capacitor 402 is applied to the control circuit 116.

The signal inputted to the terminal 200 of the gate signal generation circuit 123 may be the output signal of the sensor 301 described in the second embodiment as replacement for the output signal of the divider 130.

Moreover, the disk 100 in the first embodiment is usable for the third embodiment as replacement for the disk 403. In this case, since the signal held by the capacitor 402 is applied to the control circuit 116 during the light beam spot passes the address area, stable tracking operation is realized.

Figure 11A:
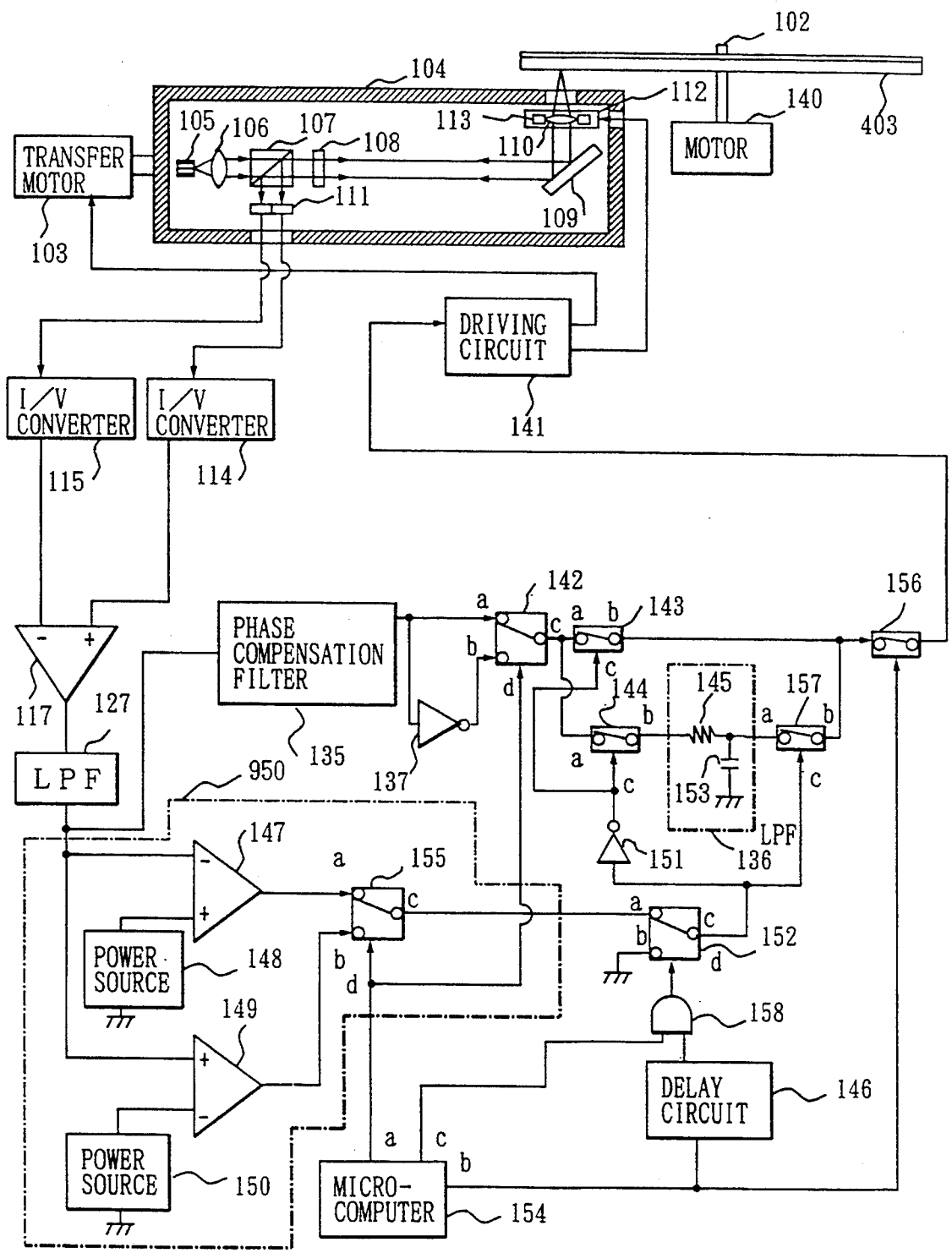
FIG. 11A is a block diagram of a tracking control apparatus of a fourth embodiment of the present invention.

FIG. 11A is a block diagram of the tracking control apparatus of a fourth embodiment of the present invention. In FIG. 11A, components functioning in the same manner as in the arrangement of FIG. 1 are designated by the like numerals as used with corresponding parts shown in FIG. 1 and will not be described. Referring to FIG. 11A, the disk 403 is mounted on the rotating shaft 102 of the motor 140 and is rotated at a predetermined revolution speed. The disk 403 is the same as that used in the third embodiment, and the common address mark 95 of the groove track GT and land track LT is disposed between the groove track GT and land track GT in the address area in a manner similar to FIG. 8.

The I/V converters 114 and 115 convert input currents to voltages corresponding to the current values. These voltages are applied to the differential amplifier 117. In the differential amplifier 117, a difference of both the input voltages is derived, and the derived value is applied to comparators 147 and 149 and a phase compensation filter 135 through the low-pass filter 127. The output of the differential amplifier 117 is the tracking error signal. The relation between track configuration of the disk 403 and the tracking error signal is similar to those in the third embodiment shown in FIG. 9.

In the fourth embodiment shown by FIG. 11A, the address period signal generation means 950 comprises the comparators 147, 149 and a switch 155.

In the tracking operation of the groove track GT, first, the level of the terminal "b" of a microcomputer 154 is changed from a low level to a high level in the state of a high level at the terminals "a" and "c" of the microcomputer 154. In the switches 142, 155 and 152, their terminals "a" are connected to their terminals "c" at the high level state of their terminals "d", and the terminals "b" are connected to the terminals "c" at the low level state of the terminals "d". In a similar manner, the switches 143, 144, 157 and 156 are closed at the high level state of the terminals "c", and are disconnected in the low level. Moreover, a delay circuit 146 serves to delay the input signal by several milliseconds. Consequently, for a short period of several milliseconds from a point of time the level at the terminal "b" of the microcomputer 154 has turned from the low level to the high level, the tracking error signal output from the differential amplifier 117 is applied to a driving circuit 141 through the low-pass filter 127, phase compensation filter 135, switch 142, switch 143 and switch 156. The low-pass filter 127 serves to suppress noise component in a high frequency. The phase compensation filter 135 serves to stabilize the tracking control system. By the above-mentioned configuration, a current corresponding to the tracking error signal is supplied to the tracking coil 113 of the actuator 112, and the light beam spot is controlled so as to trace the groove track GT with high response characteristic. Moreover, the transfer motor 103 is driven in compliance with the tracking error signal in a similar manner, and is controlled with low response characteristic so that the optical axis of the conversion lens 110 traces on a target groove track GT in de-energized state of the tracking coil 113.

The signal at the terminal "b" of the microcomputer 154 is applied to the delay circuit 146. Consequently, the switch 152 is changed from the state connecting between the terminals "b" and "c" to the state connecting between the terminals "a" and "c" after several milliseconds from the change of the level at the terminal "b" of the microcomputer 154 to a high level. The terminal "b" of the switch 152 is maintained at the low level. The terminal "a" of the switch 152 is connected to the terminal "c" of the switch 155. The terminal "a" of the switch 155 is connected to the terminal "c" because the terminal "d" is of the high level. The output of the comparator 147 is applied to the terminal "a" of the switch 155. The tracking error signal is applied to the invert input terminal of the comparator 147 through the low-pass filter 127. The comparator 147 outputs the signal of the high level in the state that the voltage level at the invert input terminal is lower than the negative voltage level at the noninvert input terminal which is set by a power source 148. As mentioned above, since the negative offset as shown in FIG. 10 is generated in the tracking error signal of the address area in the trace of the groove track GT, the voltage level of the power source 148 is set to a predetermined value so as to compensate the above-mentioned offset; and thus the address area is detected by operation of the comparator 147. In the address area, the conversion lens 110 is controlled on the basis of the tracking error signal (the output of the low-pass filter 136) which has been detected prior to the arrival at the address area of the light beam spot.

Operation in the address area is elucidated with reference to FIG. 11A hereafter. When the output of the comparator 147 becomes a high level, the output of the high level is applied to an inverter 151 through switches 155 and 152, and the output of the inverter 151 becomes a low level. Consequently, the switches 143 and 144 are disconnected, and the tracking control by a normal feedback loop is suspended. Moreover, the switch 157 is closed because the terminal "c" thereof becomes a high level. The output of the low-pass filter 136 comprised of a resister 145 and a capacitor 153 is applied to the terminal "a" of the switch 157. Therefore, the output of the low-pass filter 136 is applied to the driving circuit 141 of the conversion lens 110. Since the tracking error signal which have been detected prior to an arrival of the light beam spot to the address area is applied to the resister 145 through the switch 144, the output of the low-pass filter 136 is a voltage having a frequency component in a low range of the tracking error signal prior to the arrival at the address area. Consequently, the tracking error signal is not influenced by the offset which is generated in the address area, and the light beam spot traces on the center of the groove track GT.

Subsequently, operation of the tracking control on the land track LT is elucidated. Referring to FIG. 11A, the microcomputer 154 maintains the level at the terminal "a" to a low level, and changes the level of the terminal "b" from a low level to a high level. During the period of several milliseconds after a turning of the terminal "b" of the microcomputer 154 from the low level to the high level, the tracking error signal output from the differential amplifier 117 is applied to the driving circuit 141 through the low-pass filter 127, phase compensation filter 135, inverter 137, switches 142, 143 and 156. The signal applied to the driving circuit 141 is inverted with respect to the signal for controlling the light beam spot for the groove track GT by the inverter 137. Consequently, the tracking coil 113 of the actuator 112 is activated by a current corresponding to the tracking error signal and the light beam spot is controlled so as to trace the land track LT.

Several millisecond after from the change of the level at the terminal "b" of the microcomputer 154 to the high level, the output of the terminal "c" of the switch 152 is switched from the terminal "b" to the terminal "a". The terminal "b" of the switch 155 is connected to the terminal "c" because the terminal "d" thereof is at a low level, and the output of the comparator 149 is applied to the terminal "b". The tracking error signal is applied to the noninvert input terminal of the comparator 119 through the low-pass filter 127. The comparator 149 outputs a high level signal when the level at the noninvert input terminal is higher than a positive level at the invert input terminal which is predetermined by a power source 150. As mentioned above, since the positive offset (waveform (b) in FIG. 10) is generated in the tracking error signal by tracing the address area of the land track LT, the address area is detected by such operation of the comparator 149 that the voltage of the power source 150 is predetermined to the value so as to compensate the above-mentioned offset. Control operation in the address area is similar to that in the groove track GT.

Figure 12:
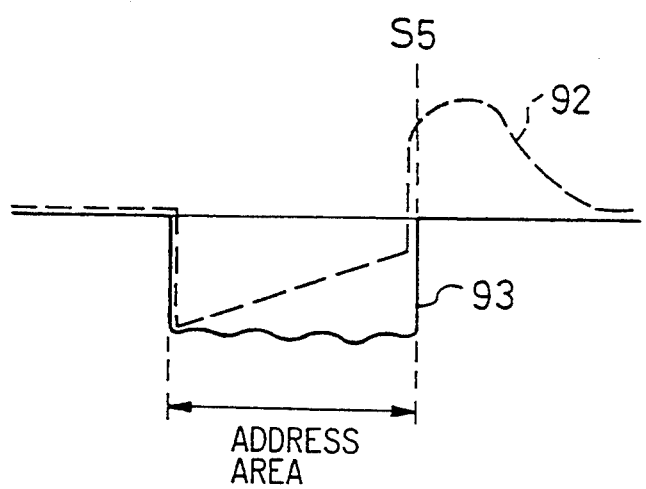
FIG. 12 is a waveform of the tracking error signal in an operation state of the tracking control system in the fourth embodiment.

FIG. 12 is a diagram illustrating examples of the tracking error signal representing effect of the offset compensation. Referring to FIG. 12, the light beam spot is controlled to trace the groove track GT. Dotted line 92 represents a tracking error signal to which the offset compensation is not applied. The value of the tracking error signal comes close to the zero level in the end (a position S5) of the address area, and the light beam spot deviates in the direction of an address mark. Consequently, the tracking error signal becomes a positive value at the position S5 (front of recording area), and the light beam spot greatly deviates from the center of the groove track GT. In the above-mentioned case, recording or reproducing of data is impossible. On the contrary, solid line 93 represents the tracking error signal in the state that the above-mentioned offset compensation is applied to the tracking error signal. The tracking error signal is given a predetermined offset, and the light beam spot is positioned in the center of the groove track GT in the address area. Moreover, the light beam spot is positioned in the center of the groove track GT at the head (position (S5)) of the recording area. Consequently, stable recording or reproducing of data is performed from the head of the recording area.

Figure 13:
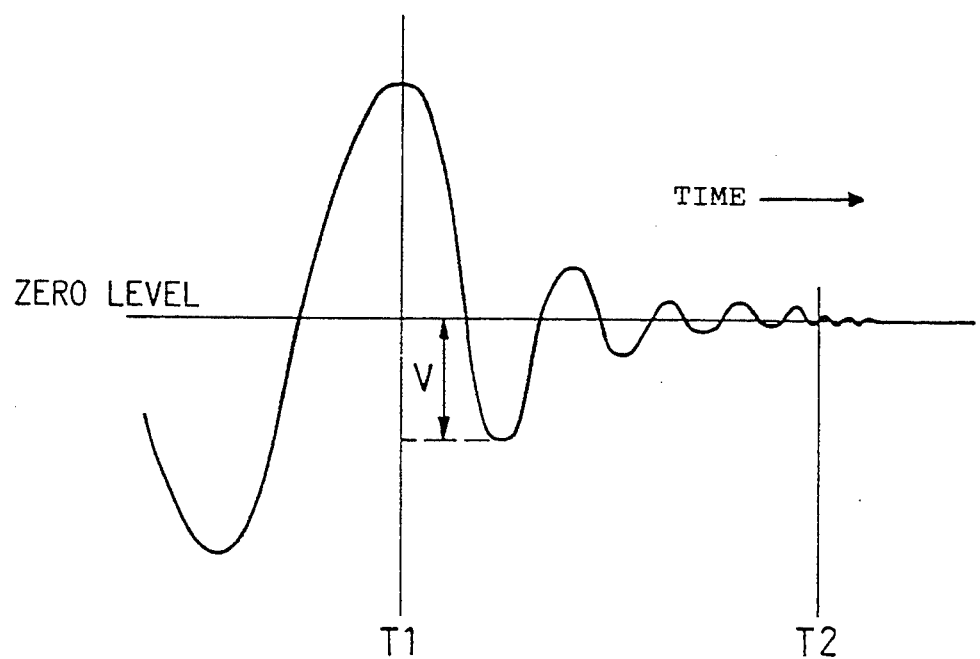
FIG. 13 is a waveform illustrating a transient response in operation of the tracking control system in the fourth embodiment.

Subsequently, operation of a delay circuit 146 is elucidated. In the tracking control system in FIG. 11A, when the tracking error signal output from the differential amplifier 117 is applied to the driving circuit 141 through the low-pass filter 127, compensation filter 135, and switches 142, 143, 156, it is defined that a "feedback loop is closed". And when the tracking error signal is not applied to the driving circuit 141, it is defined that the "feedback loop is opened". Transient response characteristic when the feedback loop is closed is changed in accordance with the level of the tracking error signal at a point of time of close of the feedback loop. FIG. 13 is a diagram illustrating variation of the tracking error signal in the case that the feedback loop is closed when the tracking error signal becomes a maximum value. According to the diagram, the tracking error signal deviates to a negative level V by transient response characteristic. In the case that the level V is lower than a voltage level (the level of the output of the power source 148) which is applied to the noninvert input terminal of the comparator 147, the tracking control operation in the address area is accomplished by the comparator 147 during a period between both point of times T1 and T2 in a transient response time in FIG. 13. Consequently, the feedback loop of the tracking control system is opened, and a recovery time increases, and thus the light beam spot cannot be positioned on a target track. In order to solve this problem, operation of the switch 152 is delayed by the delay circuit 146 by several millisecond. Consequently, the tracking control operation in the address area is started after several millisecond from close of the feedback loop of the tracking control system and thereby prolongation of the recovery time is prevented.

Operation of an AND gate 158 is elucidated hereafter. The signal output from the terminal "c" of the microcomputer 154 is applied to the AND gate 158, and the signal is of a low level during a period for recording information on the disk 403. Therefore, the terminal "d" of the switch 152 is of a low level in the period, and the tracking control operation in the address area is suspended by connecting the terminal "b" to the terminal "c". When the information is recorded on the disk 403, the intensity of the light applied to the photodetector 111 is increased because the intensity of the light of the light source 105 is increased. Consequently, the level of the tracking error signal is increased, and thereby the outputs of the comparators 147 and 149 are liable to high levels out of the address area by exceeding the level of the power source 148. In order to solve this problem, the tracking control operation in the address area is suspended during the recording of the information regardless the levels of the output signals of the comparators 147 and 149, and thereby open of the feedback loop is prevented.

In the embodiment, the tracking error signal is applied to the comparators 147 and 149 through the low-pass filter 127. If the output of the low-pass filter 127 is transmitted through a high-pass filter, stable detection of the address area is realizable. In general, a frequency component which is lower than the control frequency range is included in the tracking error signal in the closed state of the feedback loop. The low frequency component causes a control error. If the low frequency component is suppressed by the added high-pass filter, an accuracy in detection of the tracking error signal by the comparators 147 and 149 is improved.

Figure 10:
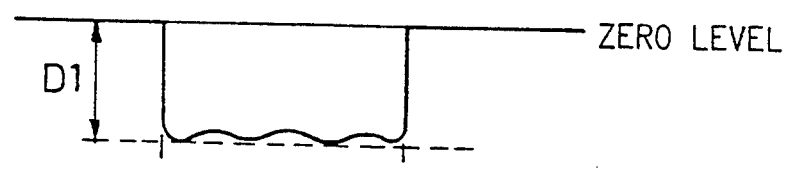
FIG. 10 is a diagram illustrating waveforms of the tracking error signals in the case that the light beam spot is moved along the center of the track in the third embodiment.
Figure 10:
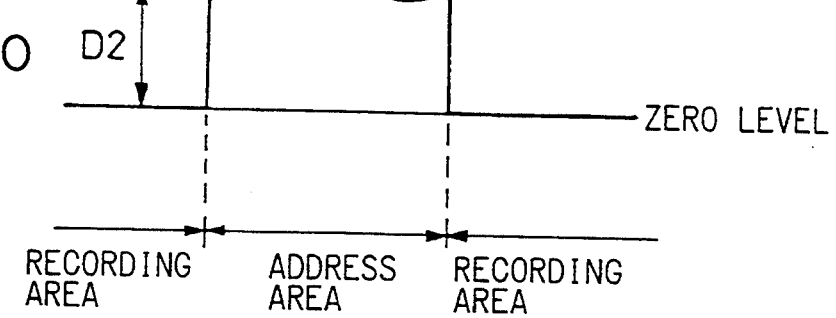
Figure 11B:
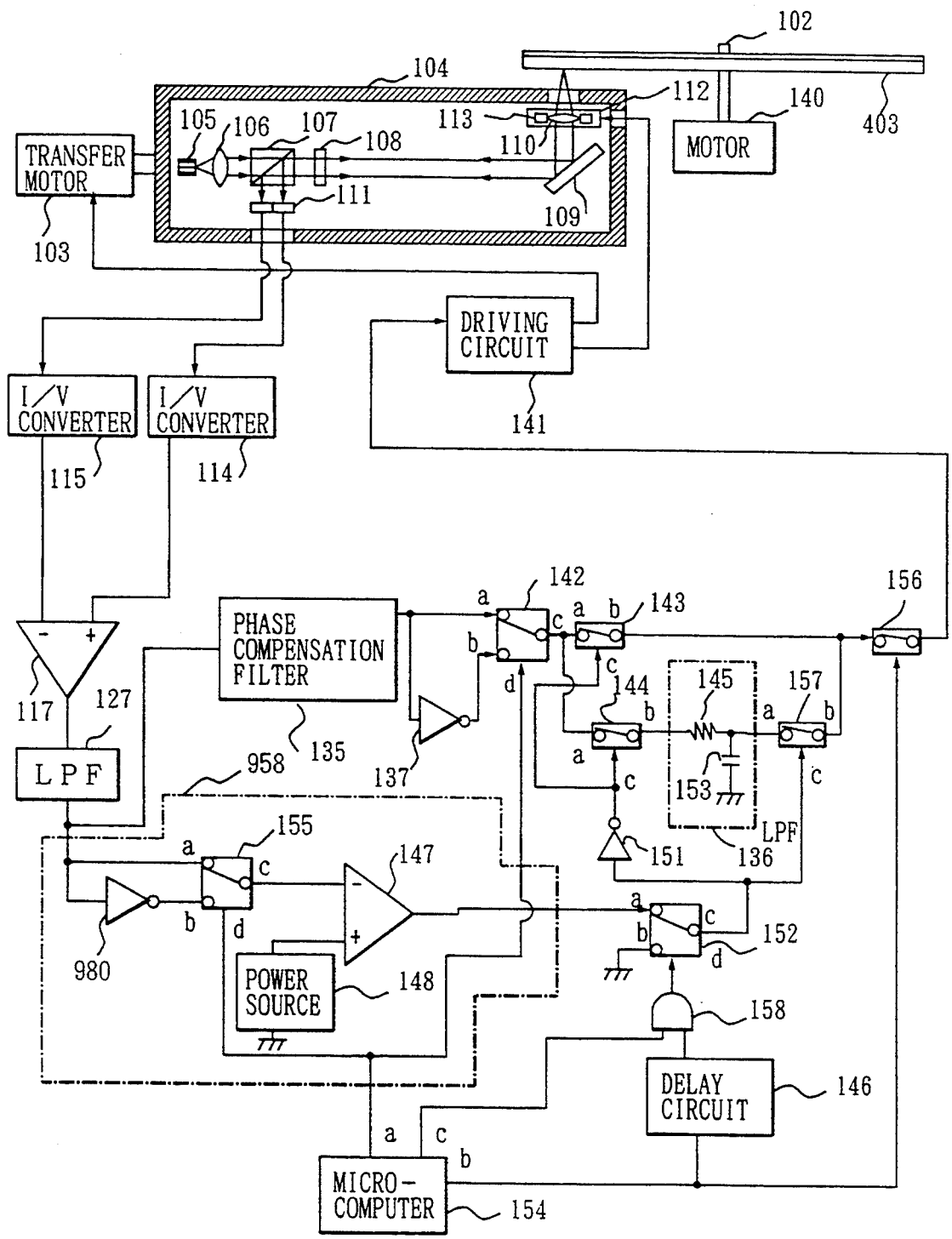
FIG. 11B is a block diagram of the tracking control apparatus using other configuration of an address period signal generation means in the fourth embodiment.

Moreover, in the fourth embodiment, the address area of the groove track GT is detected by the comparator 147 on the basis of the reference voltage of the power source 148, and the address area of the land track LT is detected by the comparator 149 on the basis of the reference voltage of the power source 150. As other method, an inverted signal of the output of the low-pass filter 127 is applied to the comparator 147 during tracking operation to the land track LT, and the terminal "a" of the switch 155 is connected to the terminal "c" thereof. FIG. 11B is a block diagram of the tracking control apparatus of the above-mentioned configuration. As shown in FIG. 10, in the address area, the polarity of the output signal of low-pass filter 127 with respect to the land track LT is inverse to that with respect to the groove track GT. Therefore, the inverted signal of the output of the low-pass filter 127 with respect to the land track LT is similar to the output of the low-pass filter 127 with respect to the groove track GT. Consequently, the address areas of both the land track LT and groove track GT can be detected by the comparator 147.

In the fourth embodiment, the polarity of the tracking error signal may be changed in accordance with the circuit configuration. The change of the polarity may be conformed with other components by changing polarities of the comparators 147 and 149 and the power sources 148 and 150.

Figure 14:
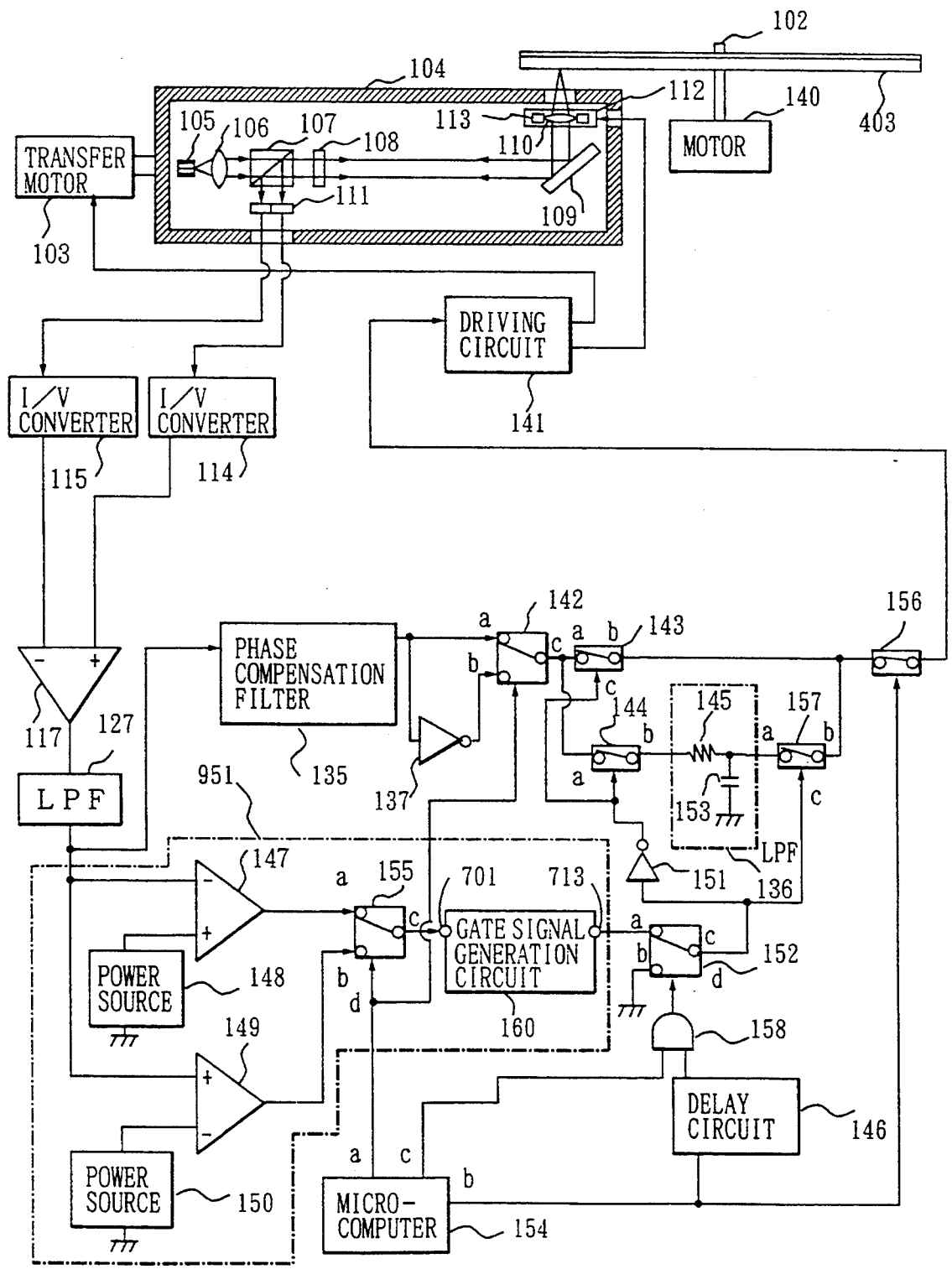
FIG. 14 is a block diagram of a tracking control apparatus of a fifth embodiment of the present invention.
Figure 16:
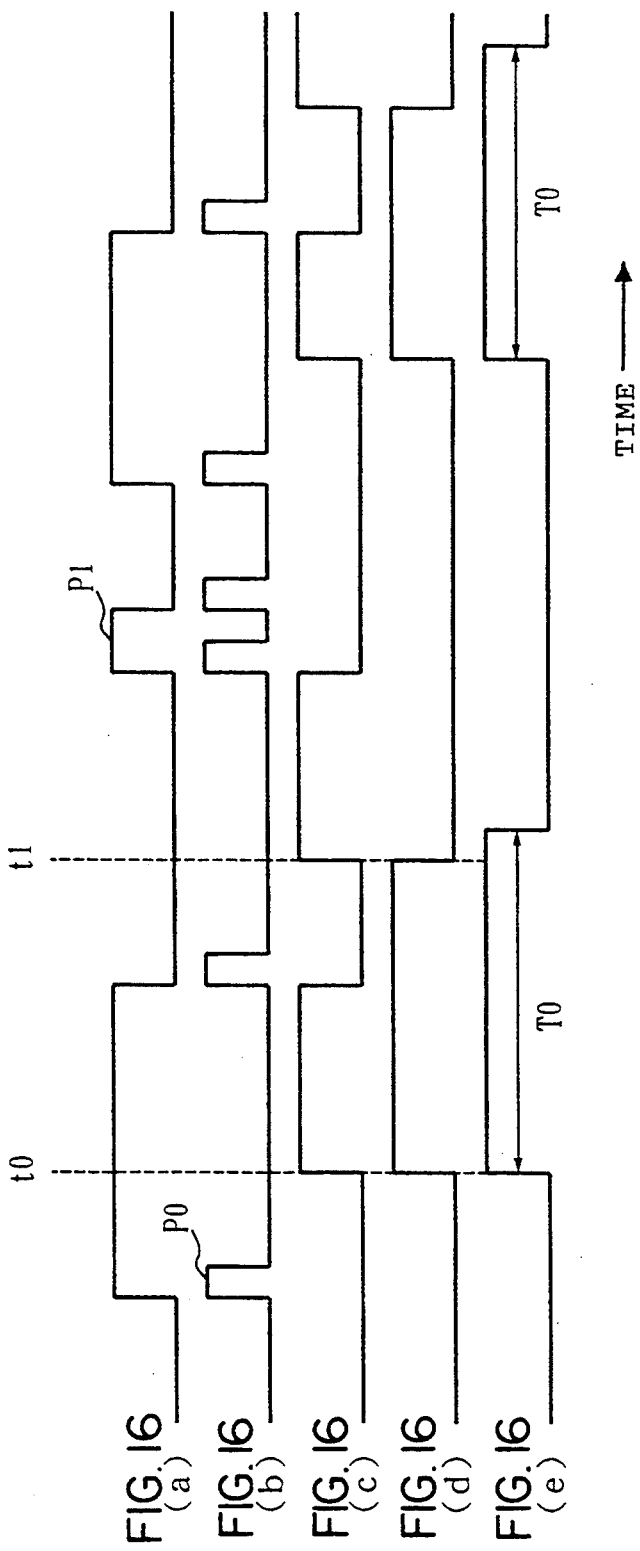
FIG. 16 is a diagram illustrating waveforms in operation of the gate signal generation circuit 160 in the fifth embodiment.

FIG. 14 is a block diagram of the tracking control apparatus of a fifth embodiment of the present invention. In FIG. 14, components functioning in the same manners as in the arrangement of FIG. 11A are designated by the like numerals as used with corresponding parts shown in FIG. 11A and will not be described. A feature of the fifth embodiment is to be provided with a gate signal generation circuit 160 which is inserted between the terminal "c" of the switch 155 and the terminal "a" of the switch 152. When the input signal of the gate signal generation circuit 160 turns from a low level to a high level, a signal of a high level is output during a predetermined time period T0 as shown in FIG. 16.

Operation of the tracking control apparatus is liable to be influenced by change in a positional relation between the conversion lens 110 and the disk 403 by mechanical shock given by outside of the tracking control apparatus. In the case of a large shock and a long duration, the deviation in tracking increases in the direction corresponding to the mechanical shock even if the tracking control is activated. In this state, if the comparators 147 and 149 detect excess of the level of the tracking error signal over a predetermined level, and if the feedback loop is opened, the deviation in tracking further increases. The tracking time of the address area is predetermined in accordance with the revolution speed of the disk 403. If a signal of a high level is output during the time period T0 which is longer than the tracking time of the address area from the gate signal generation circuit 160, the feedback loop is closed for a time period T0 from generation of the mechanical shock. Consequently, increase of the deviation in tracking is prevented. In the fifth embodiment, the address period signal generation means 951 comprises the comparators 147, 148, a switch 155 and a gate signal generation circuit 160.

Figure 15:
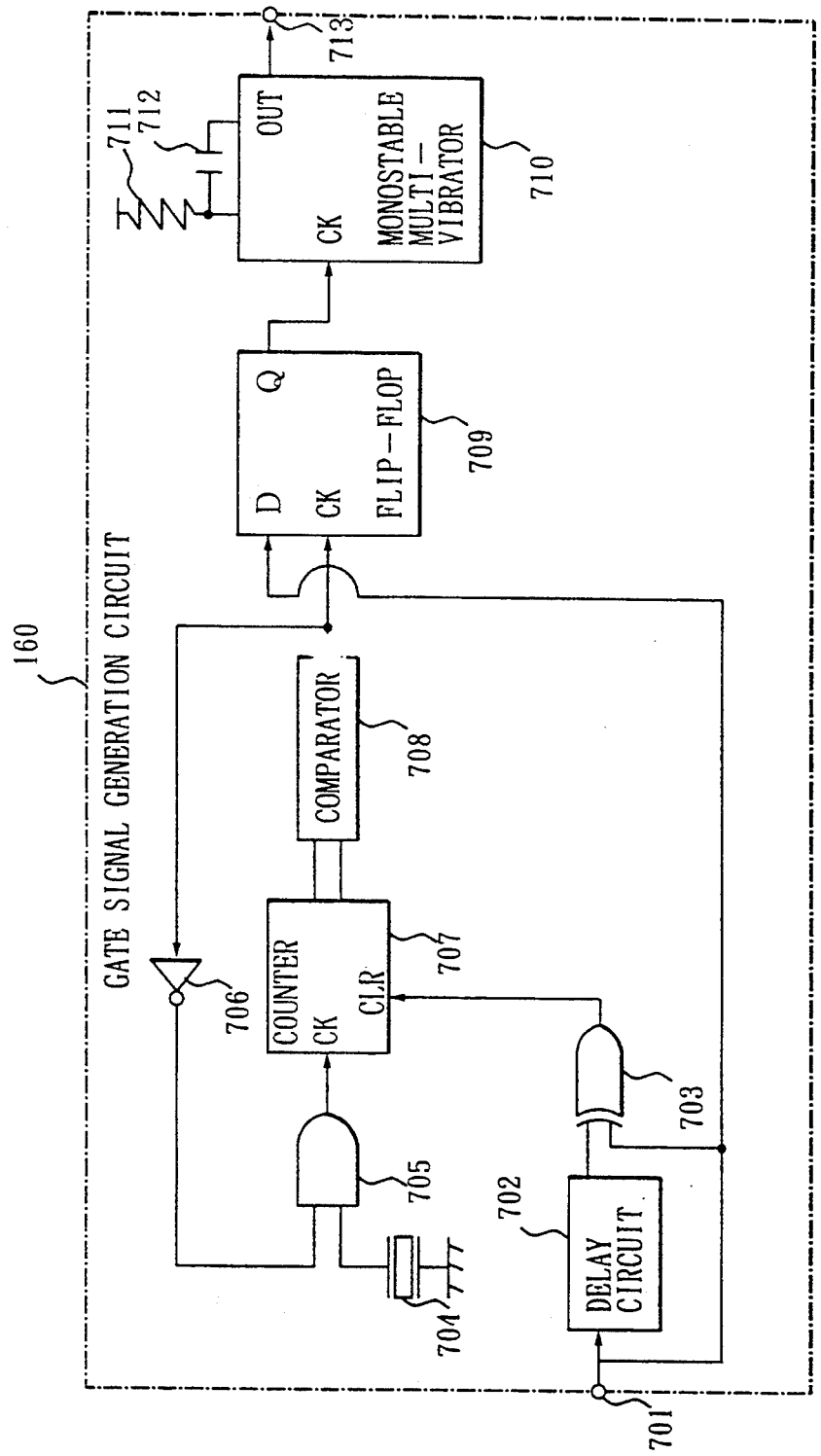
FIG. 15 is a block diagram of a gate signal generation circuit 160 in the fifth embodiment.

FIG. 15 is a block diagram of the gate signal generation circuit 160. An input terminal 701 is connected to the terminal "c" of the switch 155 in FIG. 14, and a terminal 713 is connected to the terminal "a" of the switch 152. In the case that the level of the tracking error signal output from the low-pass filter 127 is out of the range of the level predetermined by the power source 148 or 150, the signal inputted to the terminal 701 becomes a high level.

Operation of the gate signal generation circuit 160 shown in FIG. 15 is described with reference to FIG. 16. Referring to FIG. 16, a waveform (a) represents a signal inputted to the terminal 701, and a waveform (b) represents the output of an EXCLUSIVE-OR gate 703. A waveform (c) represents the output of the comparator 708, and a waveform (d) represents the output at the terminal Q of the flip-flop 709. A waveform (e) represents the output signal of the monostable multivibrator 701. The terminal 701 is connected to a delay circuit 702, an EXCLUSIVE-OR gate 703 and the terminal D of the flip-flop 709.

The output signal of the EXCLUSIVE-OR gate 703 is a result of logic operation of EXCLUSIVE-OR of the signal delayed by the delay circuit 702 and the inputted signal (waveform (a)) to the terminal 701. Namely, the output signal (waveform (b)) is a signal made by detecting fall edges and rise edges of the input signal of the terminal 701. The output Signal of the EXCLUSIVE-OR gate 703 shown by the waveform (b) is applied to the terminal CLR of a counter 707. In the counter 707, clock pulse generated by an oscillator 704 is inputted to a terminal CK and is counted during a period of a low level at the terminal CLR. A comparator 708 is structured so as to output a high level signal when the counted value of the counter 707 reaches a predetermined value M. The counted value of the counter 707 is reset to zero at reception of a pulse signal P0 shown by a waveform (b), and the counting operation is started immediately after the resetting operation. When the counted value of the counter 707 reaches the predetermined value M at a time t0, the output of the comparator 708 becomes a high level.

In the flip-flop 709, the level at the terminal D is latched at the rise edge of the signal inputted to the terminal CK and is issued to the terminal Q. Consequently, the signal (waveform (d)) at the terminal Q of the flip-flop 709 becomes a high level at the time t0, and becomes a low level at a time t1. The counted value of the counter 707 does not reach the predetermined value M during the period of a high level of the pulse P1 in the waveform (a), therefore, the signal at the terminal Q (waveform (d)) of the flip-flop 709 maintains a low level. Namely, the output level at the terminal Q of the flip-flop 709 does not change, when a time period of a high level or a low level of a pulse signal inputted to the terminal 701 is smaller than M times of the period of the output signal of the oscillator 704. Therefore, the influence by the noise of a high frequency such as the pulse P1 included in the tracking error signal is removed. The output signal of the flip-flop 709 is applied to the terminal CK of the monostable multivibrator 710, and an output signal keeping a high level during a predetermined time period from the rise edge of the input signal is output. If the time keeping the high level is set to the above-mentioned time T0, the signal can keep the high level only in the address area. The time keeping the high level is determined by a resister 711 and a capacitor 712.

As mentioned above, noise of a high frequency is suppressed in the gate signal generation circuit 160, but noise of a low frequency cannot be suppressed. The feedback loop of the tracking control system is opened during the above-mentioned time period T0 when an error signal is detected due to the noise. Consequently, the deviation of tracking is liable to increase by disturbances such as mechanical shocks. In the case that the disk rotates at a constant revolution speed and the address areas are arranged with the same interval, the tracking time is a constant in every address area. Therefore, after the feedback loop is closed, the feedback loop is not opened even if the output of the comparator 147 or 149 becomes a high level until the light beam spot is expected to arrive the subsequent address area. Consequently, if the noise is detected by the comparator 147 or 149, the noise is not applied to the tracking control system, and thus the stable tracking control is realizable.

Figure 17:
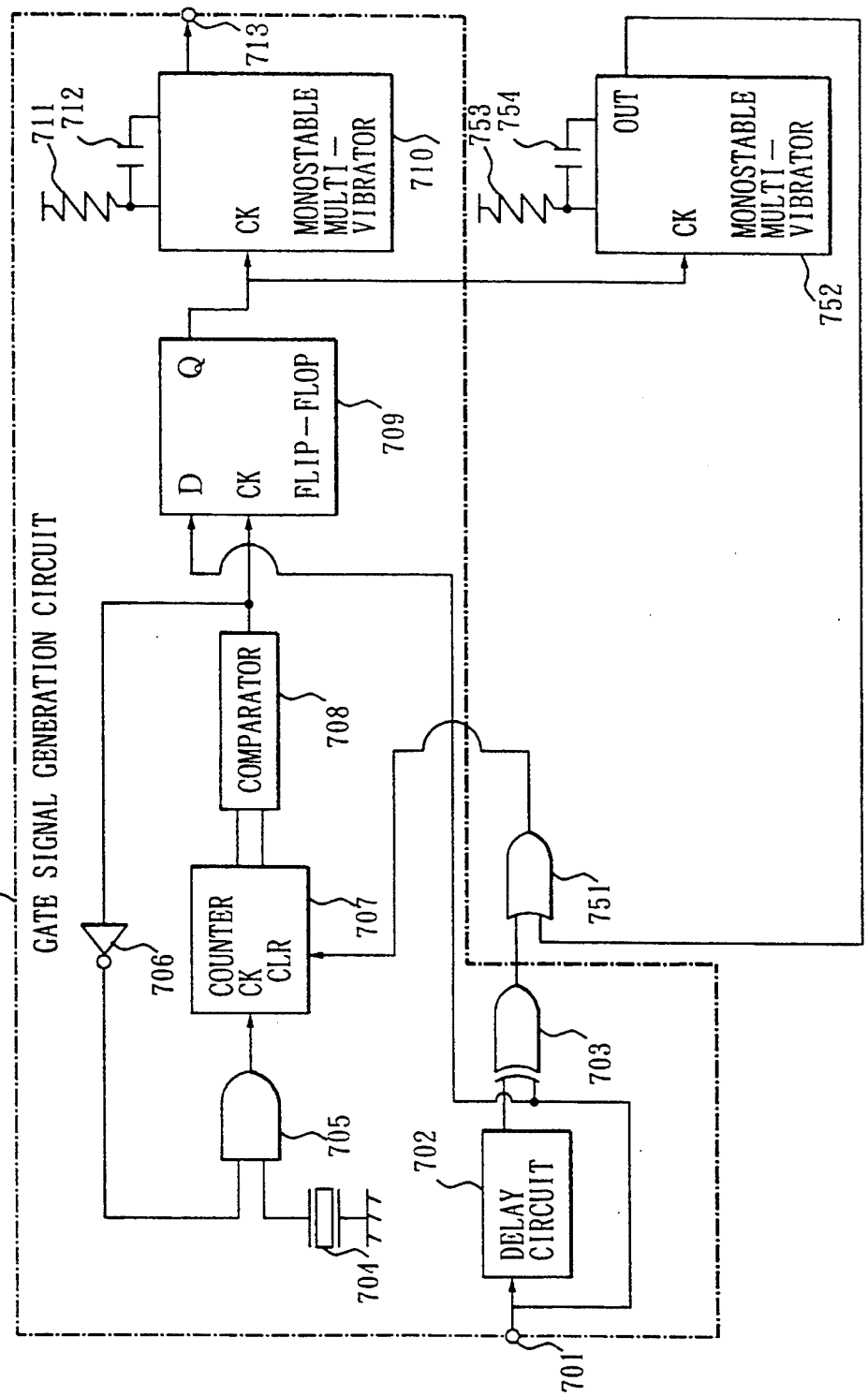
FIG. 17 is a block diagram of a gate signal generation circuit 750 in the fifth embodiment.

FIG. 17 is a block diagram of a gate signal generation circuit 750 having the above-mentioned function. If the gate signal generation circuit 160 in the fifth embodiment shown in FIG. 15 is replaced with the gate signal generation circuit 750, the tracking control apparatus having the above-mentioned function is realizable.

Figure 18:
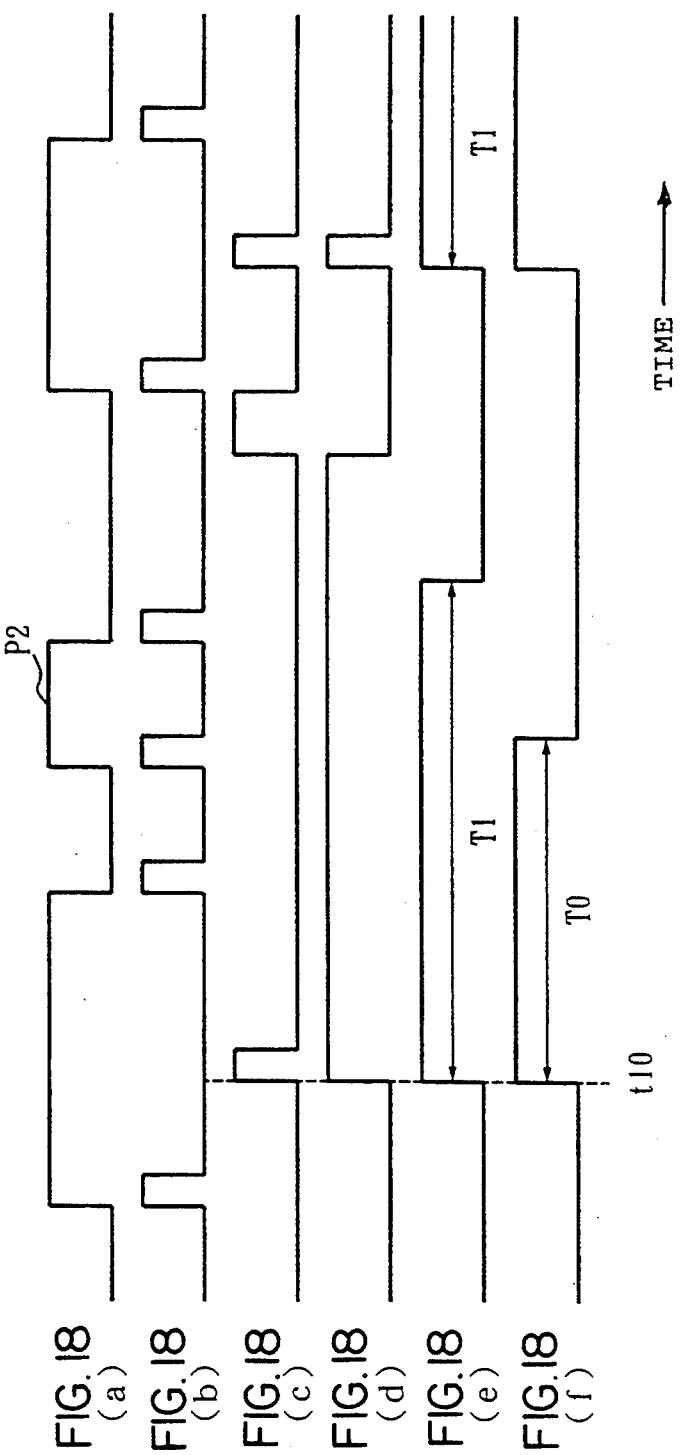
FIG. 18 is a diagram illustrating waveforms in operation of the gate signal generation circuit 750 in the fifth embodiment.

In FIG. 17, components functioning in the same manner as in the arrangement of FIG. 15 are designated by the like numerals as used with corresponding parts shown in FIG. 15 and therefore will not be described. Operation of the gate signal generation circuit 750 shown in FIG. 17 is described with reference to FIG. 18. Referring to FIG. 18, a waveform (a) represents an input signal to the terminal 701, and a waveform (b) represents the output of the EXCLUSIVE-OR gate 703. Moreover, a waveform (c) represents the output of the comparator 708, and a waveform (d) represents the output of the flip-flop 709. A waveform (e) represents the output of the monostable multivibrator 752, and a waveform (f) represents the output of the monostable multivibrator 710. When the counted value of the counter 707 becomes the value M at the time t10, the output of the comparator 708 becomes a high level (waveform (c)). Moreover, since the signal of a high level is inputted to the terminal D of the flip-flop 709, the output thereof becomes a high level (waveform (d)). The monostable multivibrator 752 has the same function as the monostable multivibrator 710. The period maintaining a high level in the output of the monostable multivibrator 710 is predetermined to a time T1 by a resister 753 and a capacitor 754. Consequently, when the output of the flip-flop 709 becomes a high level at the time t10 (waveform (d)), the output of the monostable multivibrator 752 keeps a high level during the time T1 (waveform (e)). When the output (waveform (e)) of the monostable multivibrator 752 becomes the high level, the output of the OR-gate 751 becomes a high level, the counted value of the counter 707 is maintained to zero during the time period T1. Therefore, the monostable multivibrator 710 is not activated by a pulse P2 such as noise. Namely, open of the feedback loop of the tracking control system due to the noise is prevented by setting the time period T1 which is shorter than the tracing time of the address area.

In the fifth embodiment, a next point of time when the light beam spot will arrive the subsequent address area was predicted with reference to a point of time when detected the address area. Alternatively, a point of time when reading the address information may be used as the reference. Moreover, apart from the aforementioned embodiment wherein the output of the comparator 147 or 149 is interrupted until a time point at which the light beam spot is predicted to arrive the subsequent address area in the fifth embodiment, an alternative way may be such that the point of time is predicted with reference to the prior address area, and a gate signal representing the subsequent address area may be generated. Subsequently, a period in which the above-mentioned gate signal is overlapped on a gate signal generated by changing the output of the comparator 147 or 149 to a high level may be made the period of the address area.

In the fourth and fifth embodiments, the address area is detected by the comparator 147 in the tracking control of the groove track GT, and the address area is detected by the comparator 149 in the tracking control of the land track LT. In another application, as shown in FIG. 11B, if the polarity of the input signal to the invert input terminal of the comparator 147 is inverted by an inverter 980 in the tracking control of the land track LT, the operation is realizable by only one comparator 147.

Figure 19:
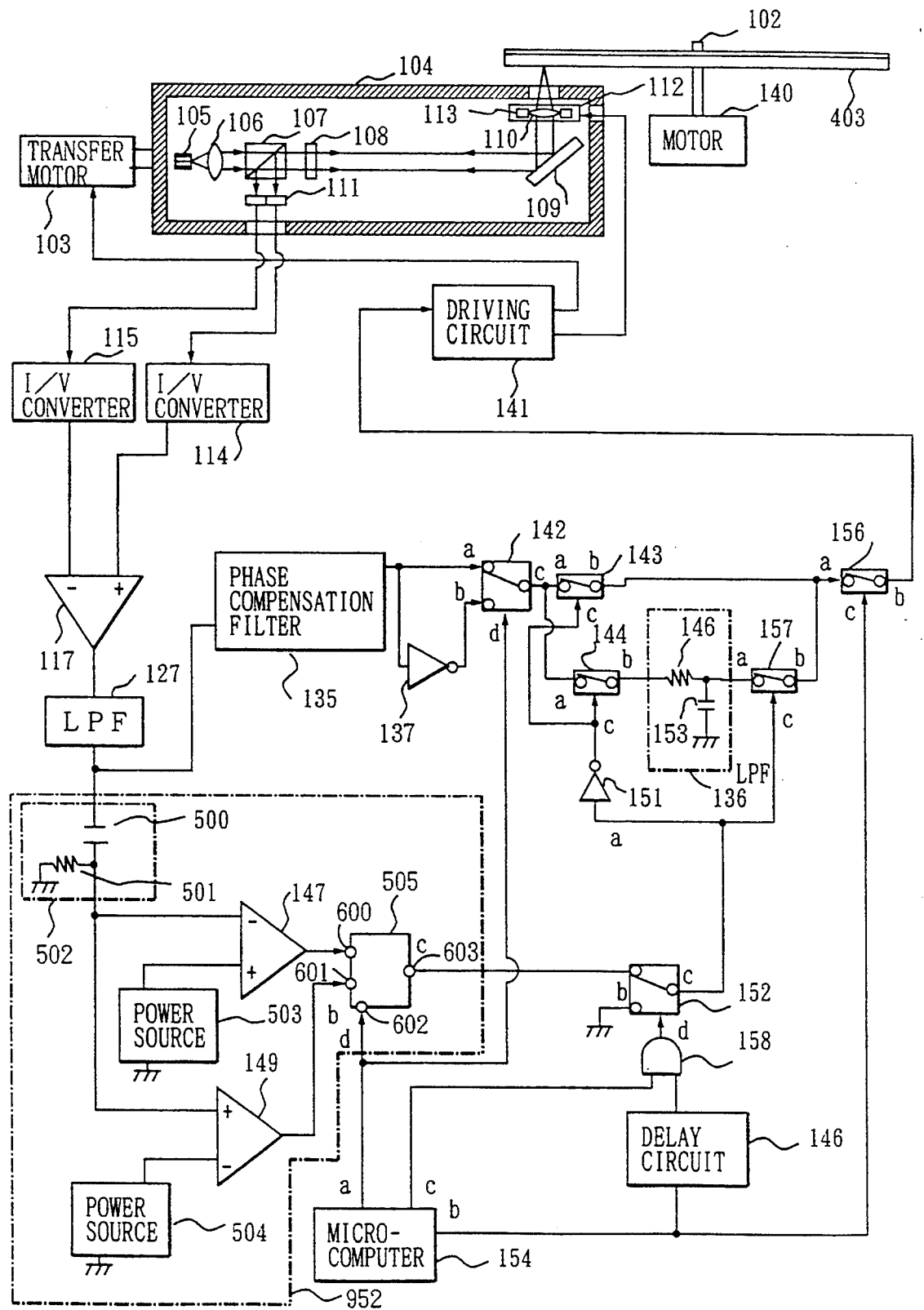
FIG. 19 is a block diagram of a tracking control apparatus of a sixth embodiment of the present invention.

FIG. 19 is a block diagram of the tracking control apparatus of a sixth embodiment of the present invention. Referring to FIG. 19, components functioning in the same numerals in the arrangement of FIG. 11A are designated by the like numerals as used with corresponding parts shown in FIG. 11A and therefore will not be described. In the sixth embodiment, the output of the low-pass filter 127 is applied to the comparators 147 and 149 through a high-pass filter 502 composed of a capacitor 500 and a resistor 501. Moreover, the voltage levels of power sources 503 and 504 are different from those of the fourth embodiment. The switch 155 in the fourth embodiment is replaced with a gate signal generation circuit 505 in the sixth embodiment. Therefore, the address period signal generation means 952 of the sixth embodiment comprises a high-pass filter 502, the comparators 147, 149, and the gate signal generation circuit 505.

Figure 20:
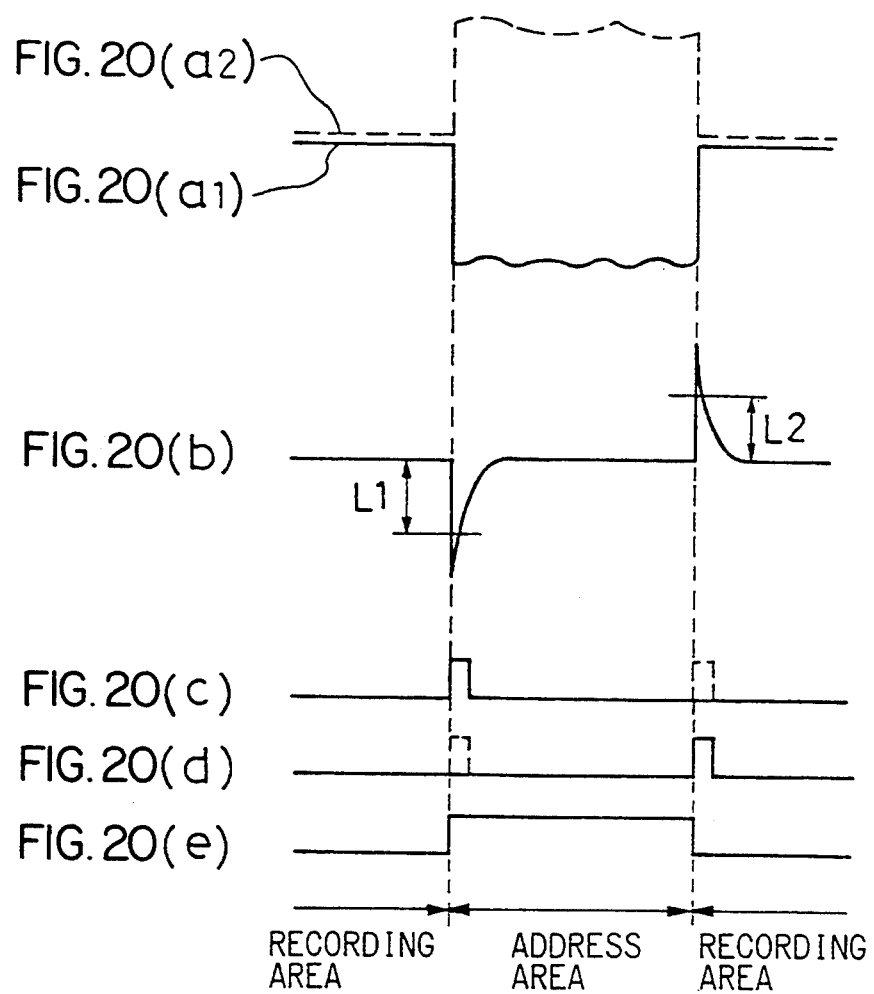
FIG. 20 is a diagram illustrating waveforms in operation of the sixth embodiment.

Operations of the high-pass filter 502, comparators 147 and 149 and the gate signal generation circuit 505 are elucidated with reference to FIG. 20. In FIG. 20, a waveform (a1) represents the output of the low-pass filter 127 in the case that the light beam spot traces on the center of the groove track GT, and is substantially identical with the waveform (a) in FIG. 10. The signal of the waveform (a1) is differentiated by the high-pass filter 502, and a signal shown by a waveform (b) is output. The signal of the waveform (b) varies greatly at the boundary of the address area and recording area. The signal is applied to the comparators 147 and 149. The levels of the power sources 503 and 504 are set to levels L1 and L2 as shown in the waveform (b). Consequently, the output of the comparator 147 becomes a pulse signal (waveform (c)) representing a starting point of the address area. Moreover, the output of the comparator 149 becomes a pulse signal (waveform (d)) representing an end of the address area.

The output (waveform (e)) of the gate signal generation circuit 505 becomes a high level by reception of the pulse signal of the waveform (c) and becomes a low level by reception of the pulse signal of the waveform (d). Consequently, the output of the gate signal generation circuit 505 becomes the high level in the address area. A waveform (a2) represents the output of the low-pass filter 127 in the case that the light beam spot traces on the center of the land track LT. In this case, the pulse signals in the waveform (c) and the waveform (d) are generated at the positions illustrated by dotted lines. Consequently, operation of the gate signal generation circuit 505 is switched on the basis of the signal inputted from the terminal "a" of the microcomputer 154 in accordance with the groove track GT or the land track LT.

Figure 21:
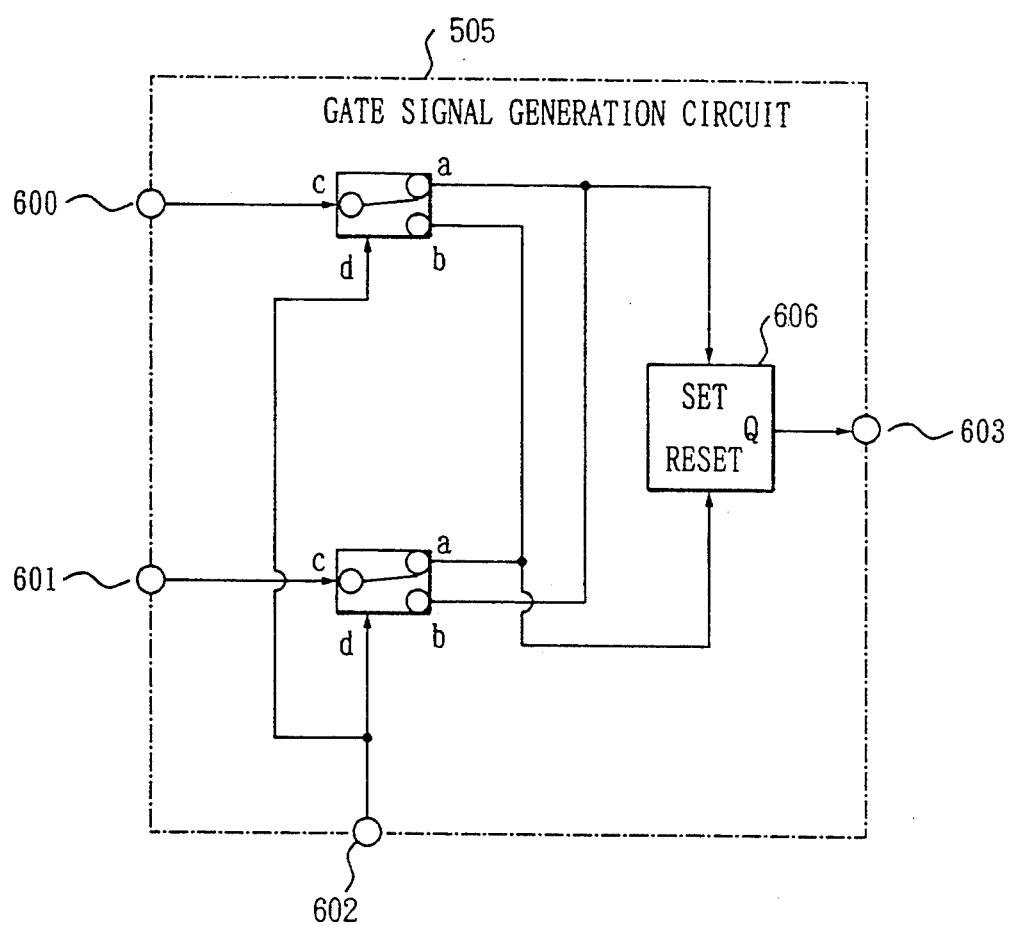
FIG. 21 is a block diagram of a gate signal generation circuit 505 in the sixth embodiment.

FIG. 21 is a block diagram of the gate signal generation circuit 505. Referring to FIG. 21, a terminal 600 is connected to the comparator 147 in FIG. 19. In a similar manner, a terminal 601 is connected to the comparator 149, a terminal 602 is connected to the terminal "a" of the microcomputer 154, and a terminal 603 is connected to the terminal "a" of the switch 152. The terminals "c" of the switches 604 and 605 are connected to the respective terminals "a" in the case of a high level at the terminals "d". On the other hand, in the case of a low level at the terminals "d" of the switches 604 and 605, the terminals "c" are connected to the respective terminals "b". When a pulse signal Is inputted to a terminal SET of the flip-flop 606, a terminal "Q" thereof becomes a high level, and when a pulse signal is inputted to a terminal RESET, the terminal "Q" becomes a low level.

In the above-mentioned sixth embodiment, the tracing time in the address area is accurately detected, and the time period in which the feedback loop of the tracking control system is opened is limited to the tracing time in the address area, consequently, a stable tracking control is realizable.

Figure 22:
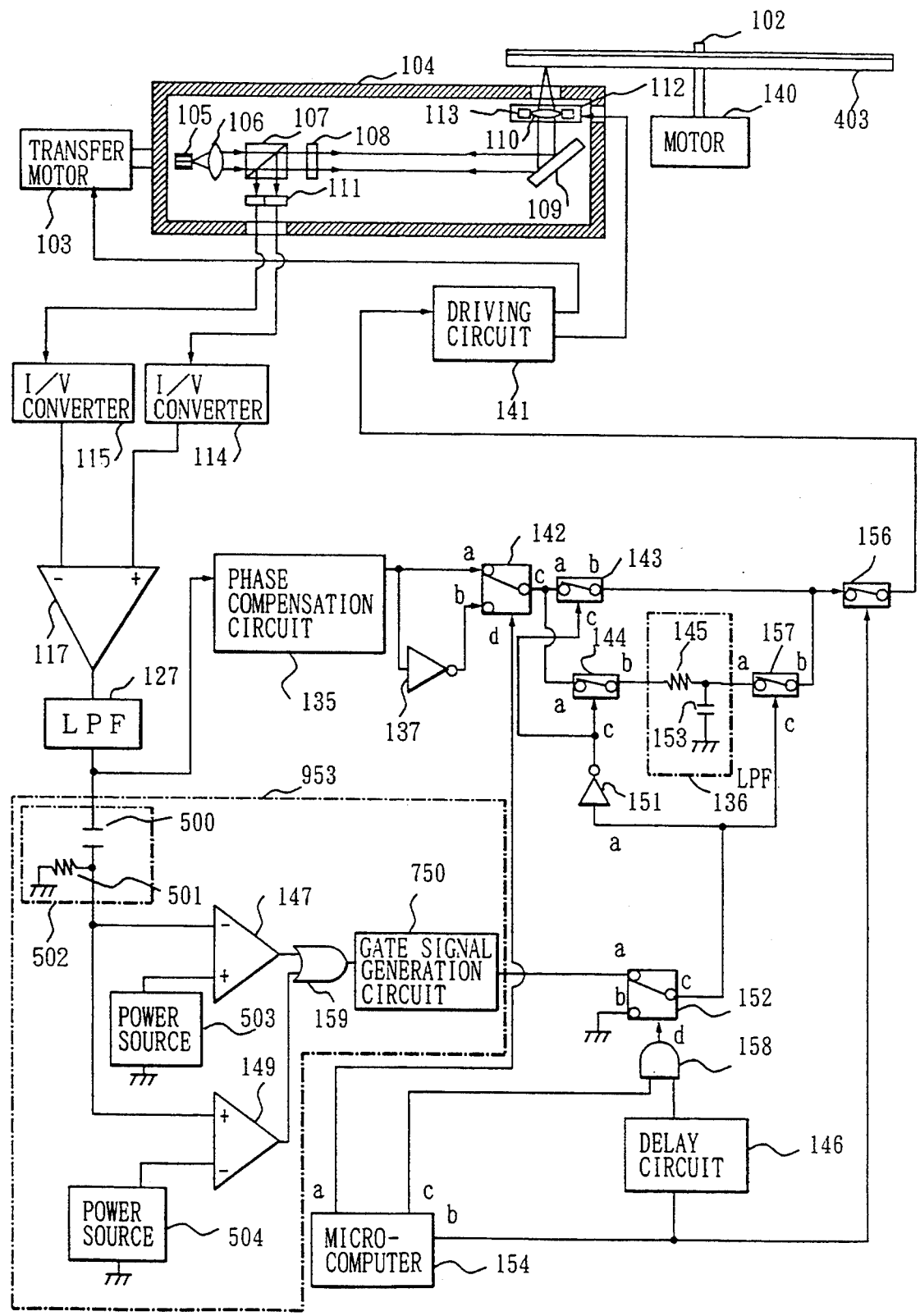
FIG. 22 is a block diagram of a tracking control apparatus of a seventh embodiment of the present invention.

FIG. 22 is a block diagram of the tracking control apparatus of a seventh embodiment of the present invention. In FIG. 22, components functioning in the same manners as in the arrangement of FIG. 19 are designated by like numerals as used with corresponding parts shown in FIG. 19 and therefore will not be described. In the seventh embodiment, the output of the comparators 147 and 149 are applied to the gate signal generation circuit 750 through an OR gate 159. The gate signal generation circuit 750 is identical with that described in the fifth embodiment. In the seventh embodiment, the address period signal generation means 953 comprises the high-pass filter 502, the comparators 147, 149, the OR gate 159 and a gate signal generation circuit 750.

Figure 23:
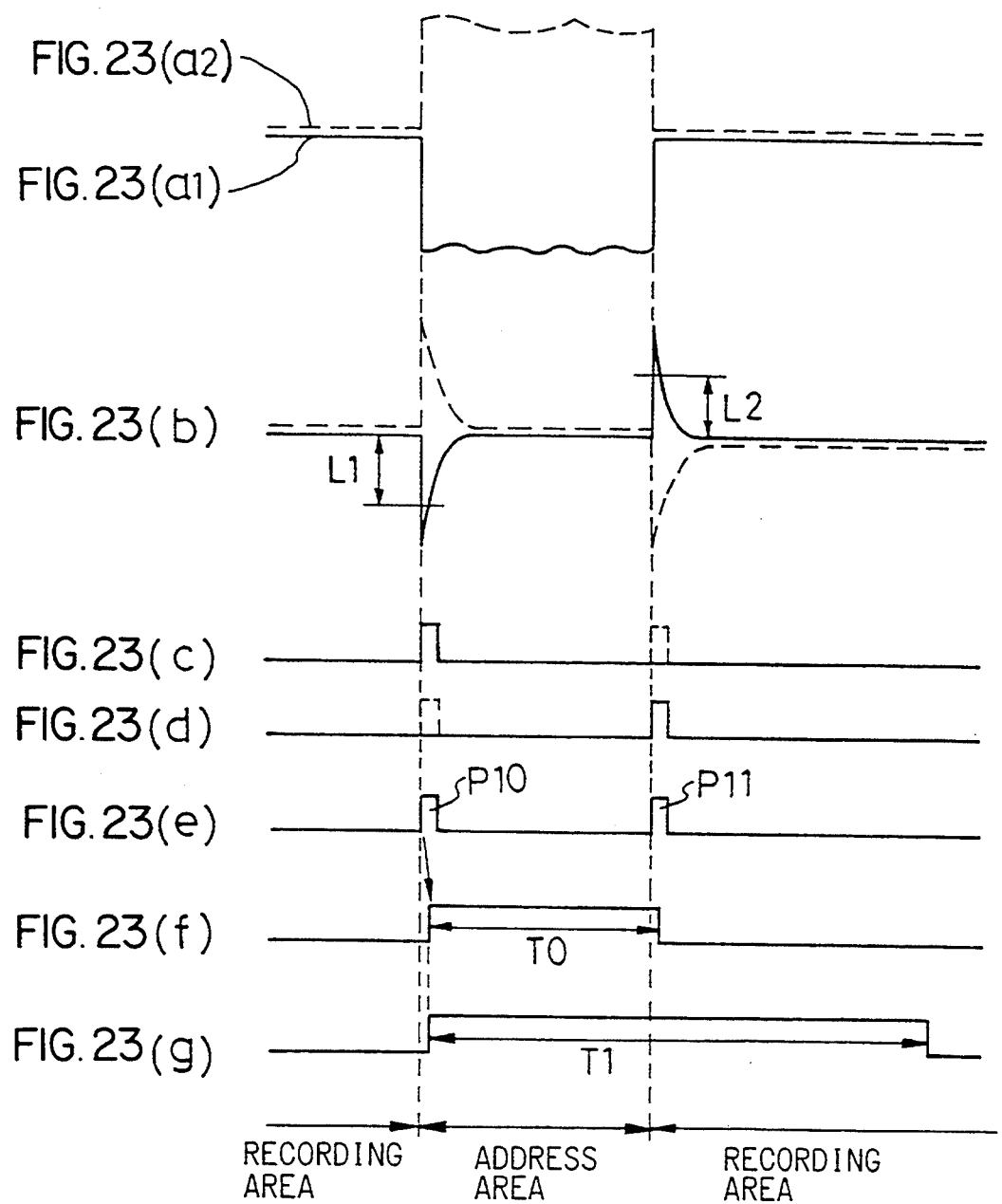
FIG. 23 is a diagram illustrating waveforms in operation of the seventh embodiment.

Operation of the seventh embodiment is described with reference to FIG. 23. In FIG. 23, a waveform (a1) represents an output of the low-pass filter 127 in the case that the light beam spot traces on the center line of the groove track GT. The waveform (a1) is substantially identical with the waveform (a) in FIG. 10. The signal of the waveform (a1) is applied to the high-pass filter 502 and is differentiated thereby. The differentiated output is shown by a waveform (b). Reference voltages L1 and L2 shown in the waveform (b) are applied to the comparators 147 and 149, respectively. Consequently, the output of the comparator 147 becomes a signal shown by a solid line in the waveform (c). Moreover, the output of the comparator 149 becomes a signal shown by a solid line in a waveform (d). A waveform (a2) represents the output of the low-pass filter 127 in the case that the light beam spot traces on the center line of the land track LT. In this case, the pulse signals shown in the waveform (c) and the waveform (d) are illustrated by dotted lines.

Consequently, the output of the OR gate 159 in tracing the groove track GT is identical with the output signal of the OR gate 159 in tracing the land track LT as shown by the waveform (c). The output of the OR gate 159 is applied to the gate signal generation circuit 750. When the pulse signal P10 shown by the waveform (e) is applied to the gate signal generation circuit 750, a signal of a high level is output during the time period T0 as shown by a waveform (f). However, since the pulse signal P11 is inputted during the time period T1 shown in a waveform (g), the input of the pulse signal P11 is interrupted.

In the seventh embodiment, switching operation in the detection method of the address area is not necessary in the tracking operations of the groove track GT or the land track LT. Therefore, the circuit configuration is simplified.

Figure 24:
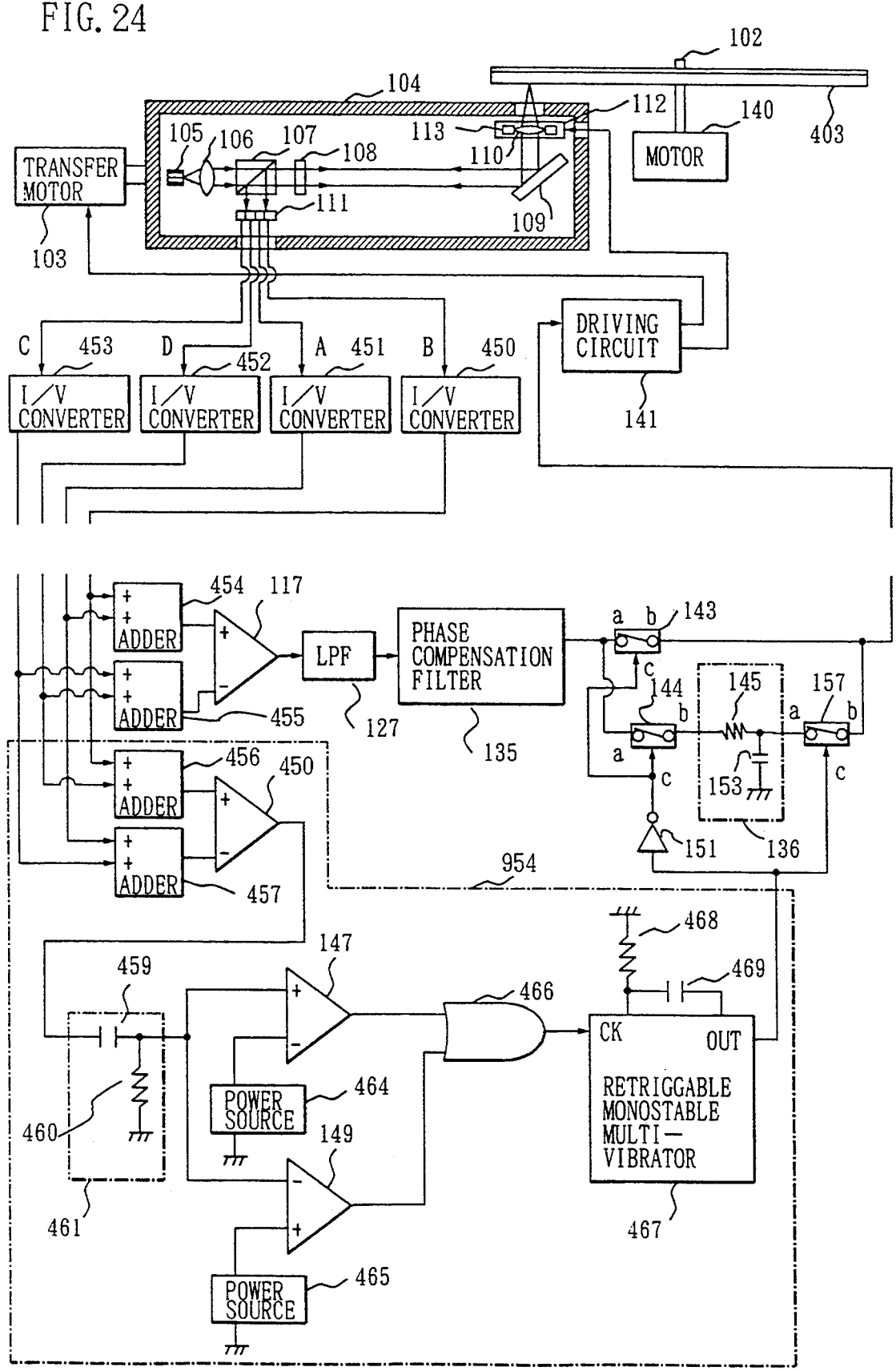
FIG. 24 is a block diagram of a tracking control apparatus of an eighth embodiment of the present invention.
Figure 25:
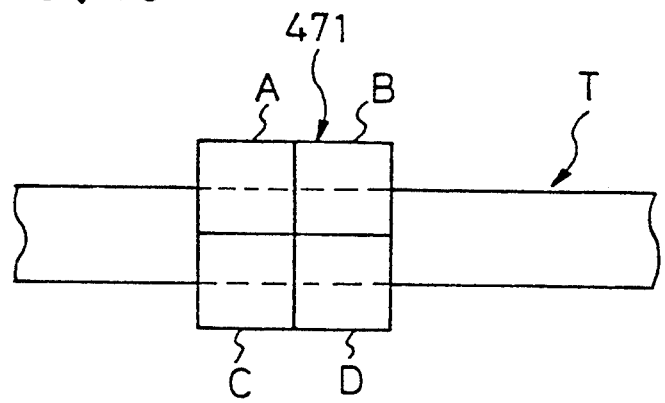
FIG. 25 is a diagram illustrating a photodetector in the eighth embodiment.

FIG. 24 is a block diagram of the tracking control apparatus of an eighth embodiment of the present invention. In FIG. 24, components functioning in the same manner as in the arrangement of FIG. 11A are designated by the like numerals as used with corresponding parts shown in FIG. 11A and therefore will not be described. As shown in FIG. 25, a photodetector 471 comprises four sensing parts A, B, C and D. The detected outputs of the sensing parts A, B, C and D are applied to I/V converters 450, 451, 452 and 453, respectively. These I/V converters 450 . . . 453 convert currents to voltages. The outputs of the I/V converters 450 and 451 are summed by an adder 454, and a resultant output of the adder 454 is applied to the noninvert input terminal of the differential amplifier 117. The outputs of the I/V converters 452 and 453 are summed by an adder 455, and a resultant output of the adder 455 is applied to the invert input terminal of the differential amplifier 117. The output of the adder 454 is similar to the output of the I/V converter 114 in FIG. 11A, and the output of the adder 455 is similar to the output of the I/V converter 115. Therefore, in a manner similar to the fourth embodiment, the output of the differential amplifier 117 becomes the tracking error signal. The waveform of the tracking error signal is similar to the waveform shown in FIG. 9.

In the eighth embodiment, the address period signal generation means 954 comprises address 456, 457, a high-pass filter 461, the comparators 147, 149, 450, OR gate 466 and a retriggable monostable multivibrator 467.

The outputs of the I/V converters 450 and 452 are summed by the adder 456, and a resultant output is applied to the noninvert input terminal of the differential amplifier 458. Moreover, the outputs of the I/V converters 451 and 453 are summed by the adder 457, and a resultant output is applied to the invert input terminal of the differential amplifier 458. The output of the differential amplifier 458 is applied to the noninvert input terminal of the comparator 147 and the invert input terminal of the comparator 149 through a high-pass filter 461 composed of a capacitor 459 and a resistor 460. The comparator 147 outputs a signal of a high level when the voltage at the noninvert input terminal is higher than a positive voltage at the invert input terminal which is given by a power source 464. Moreover, the comparator 149 outputs a signal of a high level when the voltage at the invert input terminal is lower than a negative voltage at the noninvert terminal which is given by a power source 465. Consequently, the output of the OR gate 466 becomes a high level when the output level of the high-pass filter 461 exceeds a voltage range which is given by the power sources 464 and 465. The output of the OR gate 466 is applied to the terminal CK of a retrievable monostable multivibrator 467.

The retriggable monostable multivibrator 467 outputs a signal of a high level at a time T2 which is set by a resistor 468 and a capacitor 469 when a pulse signal is applied to the terminal CK at a rise edge of the input signal. Moreover, when the signal at the rise edge is again inputted to the terminal CK during the period maintaining the high level of the output, the output is further maintained during the period T2. The operation for opening the feedback loop of the tracking control system in the state of high level of the output of the retriggable monostable multivibrator 467 is similar to that of the fourth embodiment and the elucidation is omitted.

Subsequently, configuration of the photodetector 471 is described with reference to FIG. 25. Referring to FIG. 25, the photodetector 471 having four sensing parts A, B, C and D is arranged with respect to a track T. A difference of an amount of light given to the sensing parts A and B and an amount of light given to the sensing parts C and D corresponds to the tracking error signal in the push-pull method. Moreover, a difference of an amount of light given to the sensing parts A and C and an amount of light given to the sensing parts B and D is generated only on the concave part and convex part formed on the disk.

Figure 26:
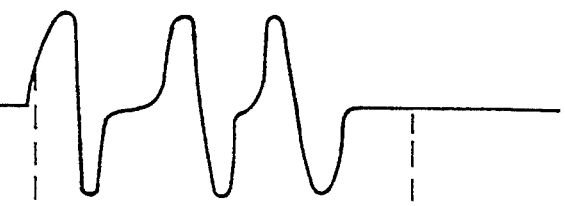
FIG. 26 is a diagram illustrating waveforms in operation of the eighth embodiment.
Figure 26:
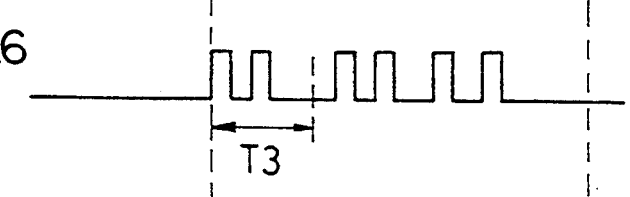
Figure 26:

An example of operation is shown in FIG. 26. As shown in a waveform (a), the tracking error signal is generated only in the address area having concave parts and convex parts. The tracking error signal is not generated at a part which is different in the reflectance of the recording layer in the recording area. Consequently, the concave parts and the convex parts of the address area may be detected by interrupting a direct current component by the high-pass filter 461 and detecting an alternate current component by the comparators 147 and 149. The output of the OR gate 466 shown by a waveform (b) in FIG. 26 is a signal detecting the concave part and the convex part of the address area. The output of the OR gate 466 is applied to the terminal CK of the retriggable monostable multivibrator 467. The output of the retriggable monostable multivibrator 467 is a signal representing the address area (waveform (c)). A time period T3 (duration) of the retriggable monostable multivibrator 467 is determined by a resistor 468 and a capacitor 469, and is set to a time interval which is longer than the time interval in tracking the convex part of the address area.

According to the eighth embodiment, the address area is correctly detected, and stable tracking control is realizable because the time period opening the feedback loop of the tracking control system is limited to the address area. Moreover, the eighth embodiment is applicable to the system arranging address area of the track to both the groove track GT and the land track LT, and a similar effect is obtainable.

FIG. 27 is a block diagram of the tracking control apparatus of a ninth embodiment of the present invention. In FIG. 27, components functioning in the same manner as in the arrangement of FIG. 11A and FIG. 24 are designated by the like numerals as used with corresponding parts shown in FIG. 11A and FIG. 24 and therefore will not be described. A disk 780 is provided with a recording layer formed by magnetooptic effect material, therefore, a reflectance of the recording layer does not change by recording information thereto.

The information is recorded by change of a direction of magnetization of the magnetooptic effect material. Reproduction of the recorded information is accomplished by a sensor (not shown) based on the magnetooptic effect. In the ninth embodiment, the address period signal generation means 955 comprises an adder 800, a high-pass filter 461, the comparators 147, 149, an OR gate 466 and the retriggable monostable multivibrator 467. The outputs of the I/V converter 114 and the I/V converter 115 are summed by an adder 800. Consequently, the output of the adder 800 is a signal corresponding to a total amount of reflected light from the disk 780. Since the reflectance of the optical disk 780 does not change by recording information, the output of the adder 800 is generated by tracing only on the address area formed by concave parts and convex parts on the disk 780. The output of the adder 800 is represented by the waveform similar to the waveform (a) in FIG. 26. Therefore, in a manner similar to the eighth embodiment, the output of the retriggable monostable multivibrator 467 is a signal representing the address area. Incidentally, since the output voltage of the high-pass filter 461 is different from that in the eighth embodiment, the levels of the power source 484 and the power source 485 are changed.

Figure 28:
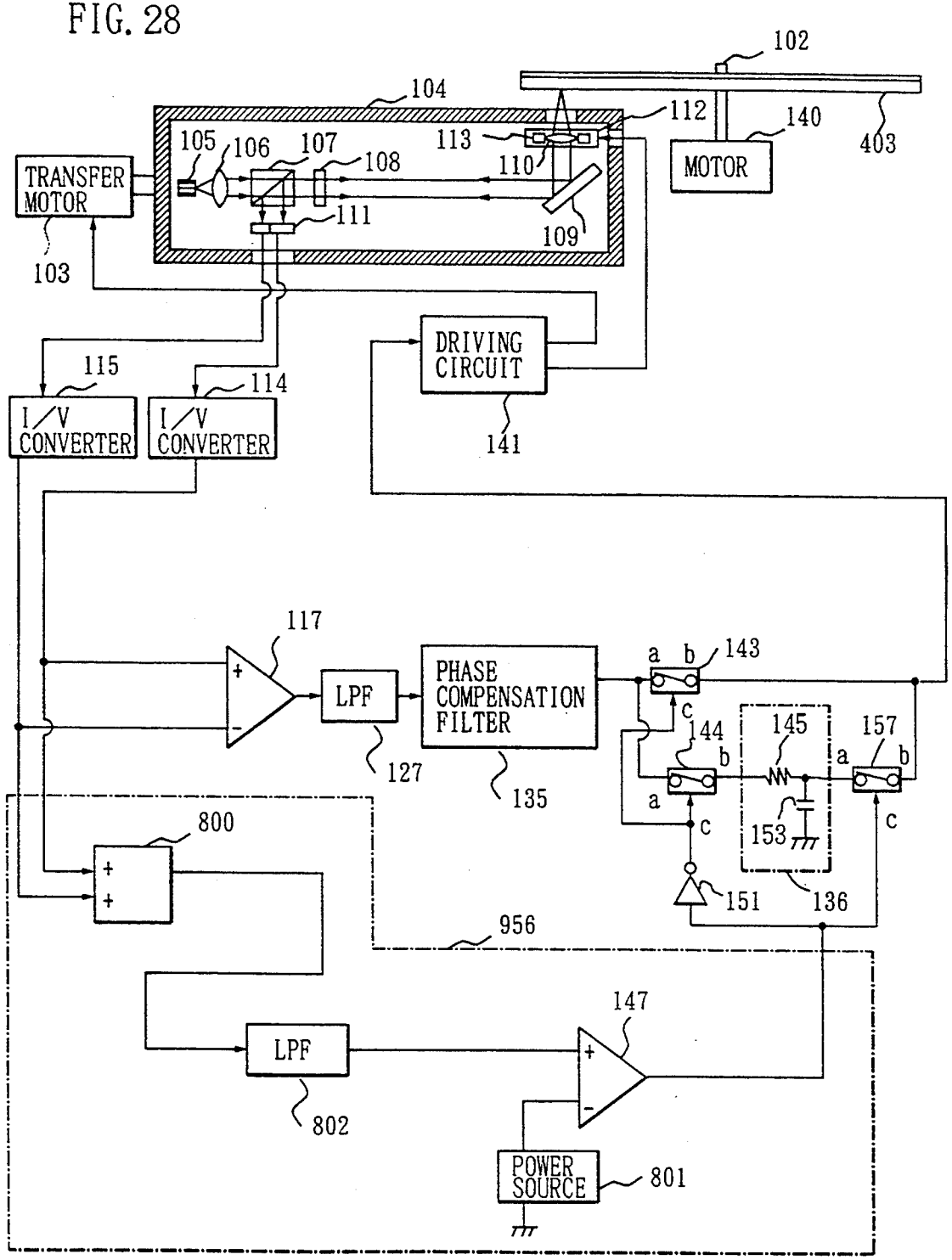
FIG. 28 is a block diagram of a tracking control apparatus of a tenth embodiment of the present invention.

FIG. 28 is a block diagram of tracking control apparatus of a tenth embodiment of the present invention. In FIG. 28 components functioning in the same manner as in the arrangement of FIG. 27 are designated by like numerals as used with corresponding parts shown in FIG. 27 and therefore will not be described. In this embodiment, the address period signal generation means 956 comprises the adder 800, a low-pass filter 802 and the comparator 147. The tenth embodiment is different from the ninth embodiment in that the output of the adder 800 is applied to the comparator 147 through a low-pass filter 802. Moreover, the output of the comparator 147 is directly applied to the inverter 151 and the switch 157. The disk 403 is provided with the recording layer of the phase change material type of which the reflectance is reduced by recording information. Therefore, the amount of reflected light becomes a maximum at concave parts of the address area.

The operation of the tenth embodiment is elucidated with reference to FIG. 29A and FIG. 29B. FIG. 29A is an enlarged fragmentary plan view of the disk 403, and the hatched parts represent convex parts on the disk 403. A waveform (a) in FIG. 29B represents an output signal of the adder 800 in the case that the light beam spot moves on a line S6 of FIG. 29A. A waveform (b) represents an output signal of the low-pass filter 802, and a waveform (c) represents an output signal of the comparator 147.

The output of the adder 800 becomes a maximum value at the concave part of the address area as shown in the waveform (a) in FIG. 29B. A high frequency component in the output signal of the adder 800 is interrupted by the low-pass filter 802. The output of the low-pass filter 802 is represented by a waveform (b). The level of the power source 801 is set to a level L3 shown in the waveform (b), and the output of the comparator 147 is made to a high level in the address area (waveform (c)). Consequently, the address area may be detected. The feature and effect in the above-mentioned ninth and tenth embodiments are similar to those in the eighth embodiment.

Figure 30A:
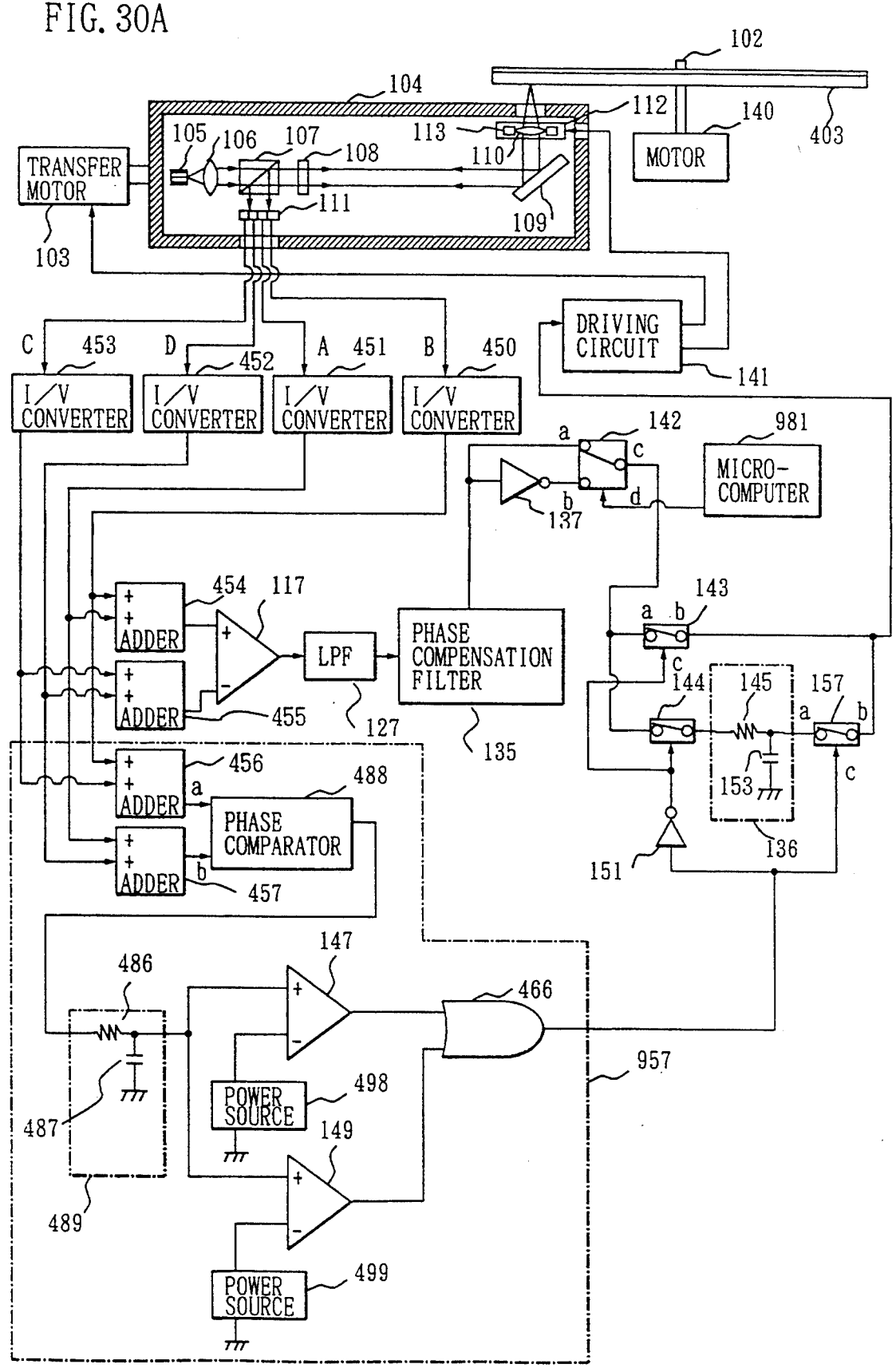
FIG. 30A is a block diagram of a tracking control apparatus of an eleventh embodiment of the present invention.

FIG. 30A is a block diagram of the tracking control apparatus of an eleventh embodiment of the present invention. In FIG. 30A, components functioning in the same manner as in the arrangement of FIG. 24 are designated by the like numerals as used with corresponding parts shown in FIG. 24 and therefore will not be described. In a similar manner to the eighth embodiment, the output of the differential amplifier 117 becomes the tracking error signal. In the state tracking the groove track GT, the output of the microcomputer 981 turns to a high level. Consequently, the tracking error signal is applied to the tracking coil 113 through the low-pass filter 127, the phase compensation filter 135, the switch 142, the driving circuit 141. In the state tracking the land track LT, the output of the microcomputer 981 turns to a low level. Consequently, the tracking error signal by tracking the groove track GT is inverted by the inverter 137, and the inverted tracking error signal is applied to the tracking coil 113. In this embodiment, the address period signal generation means comprises an adders 456, 457, a phase comparator 488, a low-pass filter 489, the comparators 147, 149 and an OR gate 466. The waveforms of the tracking error signals are similar to the waveforms (a) and (d) in FIG. 9. The outputs of the I/V converters 450 and 453 are summed by an adder 456, and the output of the adder 456 is applied to the terminal "a" of a phase comparator 488. Moreover, the outputs of the I/V converters 451 and 452 are added by an adder 457, and the output of the adder 457 is applied to the terminal "b" of a phase comparator 488. The phases of both the inputted signals are compared by the phase comparator 488, and a signal representing the difference between both the phases is output. The output of the phase comparator 488 is applied to a low-pass filter 489 composed of a resister 486 and a capacitor 487. The configuration shown in FIG. 30A represents a circuit of a tracking error detection method called a phase difference detection method in general. The output of the low-pass filter 489 becomes the tracking error signal in the phase difference detection method. The phase difference detection method detects deviation between the light beam spot and a concave part on the disk. Therefore, when the light beam spot passes on the address area formed by the concave parts and the convex parts, the tracking error signal is output from the low-pass filter 489. The output of the low-pass filter 489 is applied to the noninvert input terminal of the comparator 147 and the invert input terminal of the comparator 149. The comparator 147 outputs a signal of a high level in the state that the voltage level at the noninvert input terminal is higher than the positive voltage level at the invert input terminal set by the power source 498. Moreover, the comparator 149 outputs a signal of a high level in the state that the voltage level at the invert input terminal of the comparator 149 is lower than the negative voltage level at the noninvert input terminal set by the power source 499. The outputs of the comparators 147 and 149 are applied to an OR gate 466. When the output of the OR gate 466 is of a high level, the feedback loop of the tracking control system is opened (disconnected).

The tracking error signal detected by the phase difference detection method is elucidated with reference to FIG. 31. FIG. 31 is a diagram illustrating waveforms in the case that the light beam spot moves on the broken line S2 shown in FIG. 8, namely in the case that the light beam spot moves on the groove track GT. A waveform (a) represents an output signal of the adder 456 and a waveform (b) represents an output signal of the adder 457. A waveform (c) represents an output signal of the phase comparator 488, and a waveform (d) represents an output signal of the low-pass filter 489. When the light spot moves on the broken line S2, the phase of the output signal of the adder 457 (waveform (b)) lags the phase of the output signal of the adder 456 (waveform (a)). Consequently, the phase comparator 488 outputs the signal of a positive level (waveform (c)). The output signal of the phase comparator 488 becomes a signal represented by the waveform (d) by the low-pass filter 486. When the output level of the power source 498 is set to a level L4 shown in the waveform (d), the output of the comparator 147 becomes a high level in the address area, and thus the address area can be detected.

FIG. 32 is a diagram illustrating waveforms in the case that the light beam spot moves on the broken line S3 shown in FIG. 8, namely in the case that the light beam spot moves on the land track LT. A waveform (a) represents an output signal of the adder 456, and a waveform (b) represents an output signal of the adder 457. A waveform (c) represents an output signal of the phase comparator 488, and a waveform (d) represents an output signal of the low-pass filter 489. A waveform (e) represents an output signal of the comparator 149. The phase of the output signal of the adder 457 (waveform (b)) leads the phase of the output signal of the adder 456 in the case that the light beam spot moves on the broken line S3. Consequently, the phase comparator 488 outputs a signal of a negative level (waveform (c)). The output of the phase comparator 488 becomes a signal shown by the waveform (d) by the low-pass filter 489. The output of the comparator 149 becomes a high level in the address area by setting the output level of the power source 499 to a level L5 shown in the waveform (d).

Since the output of the OR gate 466 becomes a high level when the light beam spot passes on the address area, the feedback loop of the tracking control system is opened. The tracking error signal detected by the phase difference detection method is zero level in other area than the address area, and therefore a variation of the level of the tracking error signal in the address area can be accurately detected by the phase difference detection method.

Figure 30B:
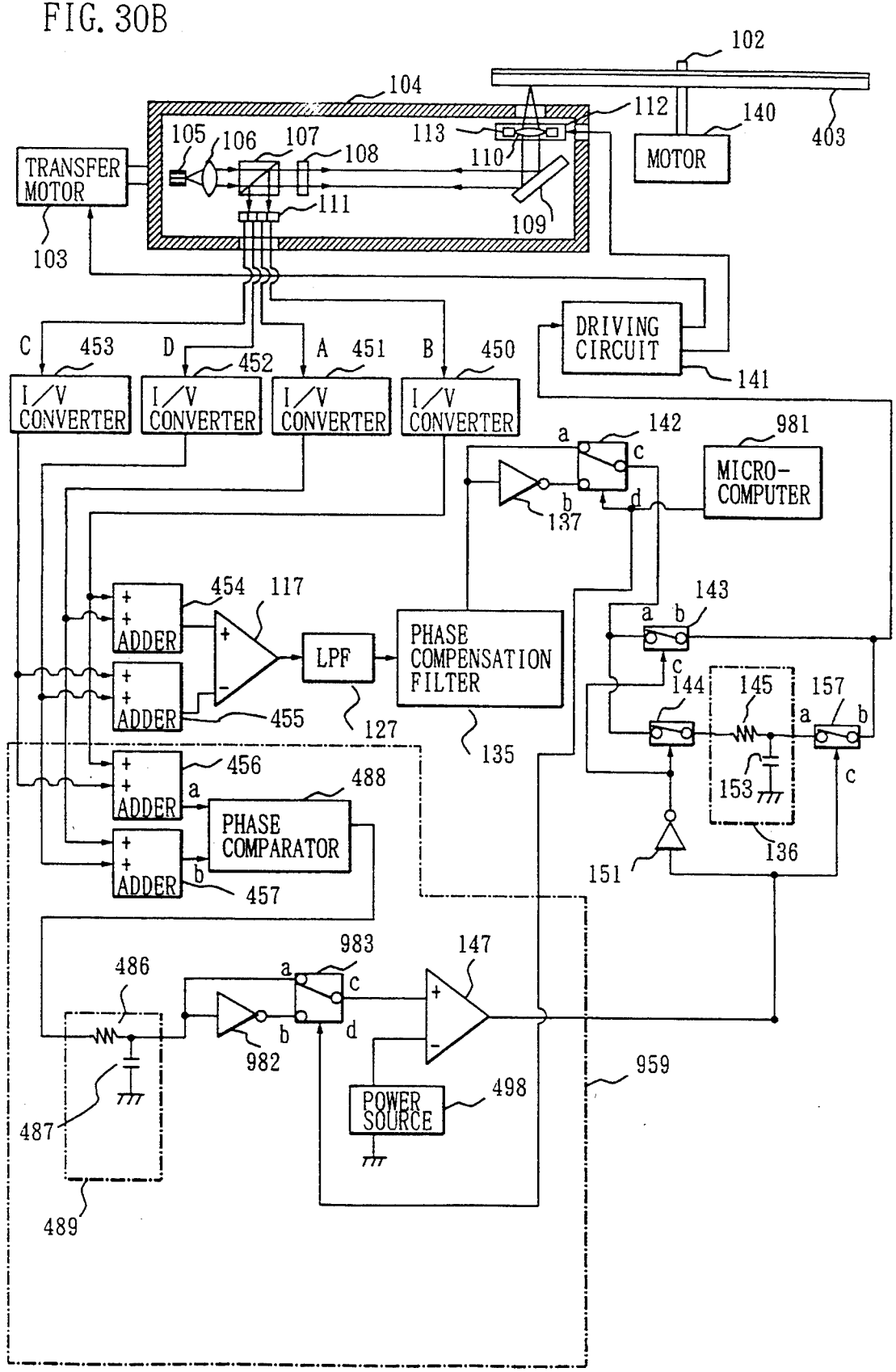
FIG. 30B is a block diagram of the tracking control apparatus using other configuration of the address period signal generation means in the eleventh embodiment.

In the eleventh embodiment, the address area of the groove track GT is detected by the comparator 147 based on a reference voltage of a power source 498, and the address area of the land track LT is detected by the comparator 149 based on a reference voltage of the power source 499. As other method, in the state tracing the land track LT, an inverted signal of the output of the low-pass filter 489 may be applied to the comparator 147. FIG. 30B is a block diagram of the tracking control apparatus representing a configuration mentioned above. In FIG. 30B, the terminal "c" of a switch 983 is connected to the terminal "a" thereof during a period tracing the groove track GT, and is connected to the terminal "b" during a period tracing the land track LT. As shown in FIG. 31 and FIG. 32, the polarity of the output of the low-pass filter 489 with respect to the land track LT is inverse to that with respect to the groove track GT. Therefore, the inverted signal of the output of the low-pass filter 489 with respect to the land track LT is similar to the output signal of the low-pass filter 489 with respect to the groove track GT. Consequently, the address area of both the land track LT and the groove track GT may be detected by the comparator 147.

Figure 33:
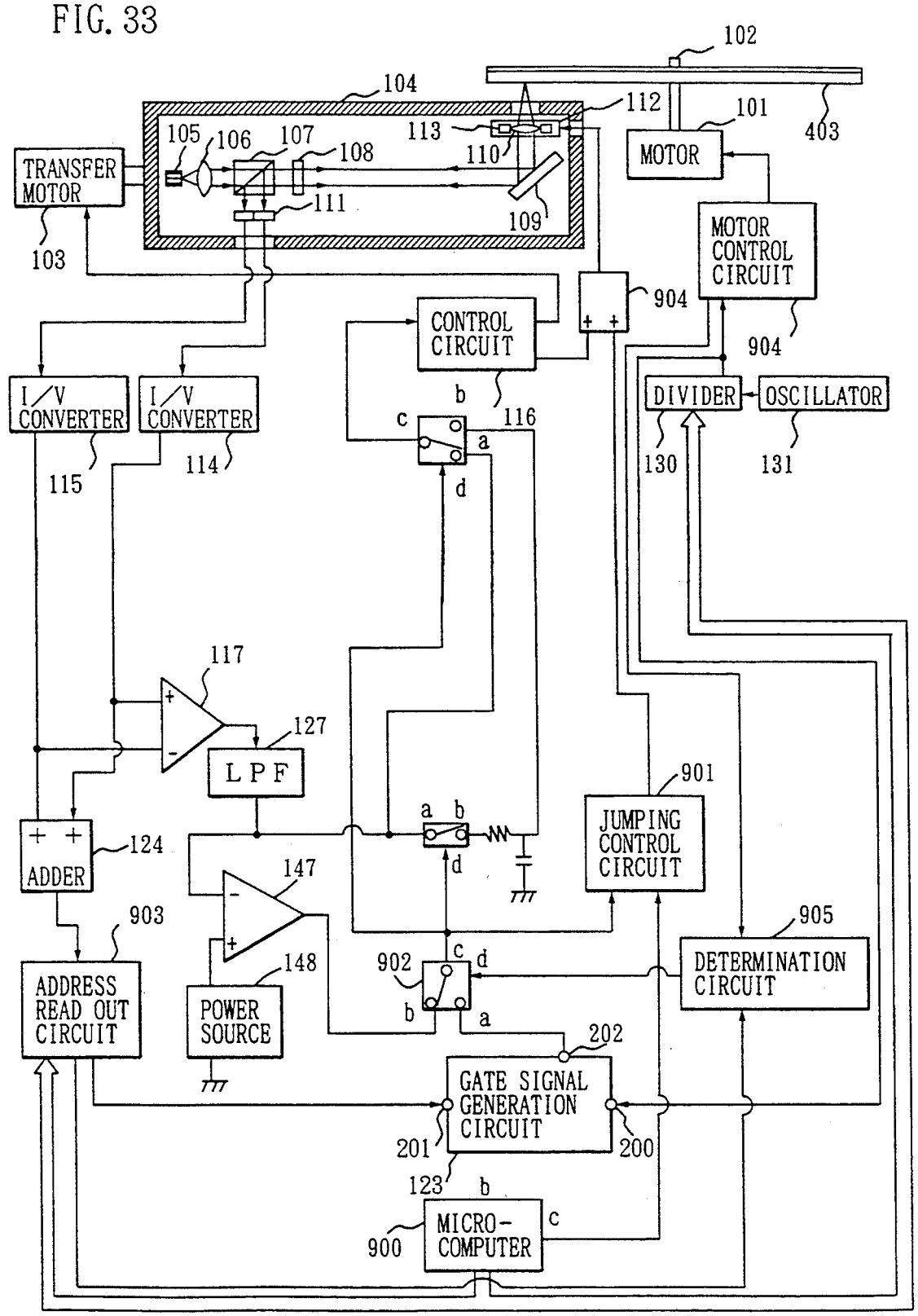
FIG. 33 is a block diagram of a tracking control apparatus of a twelfth embodiment of the present invention.
Figure 34:
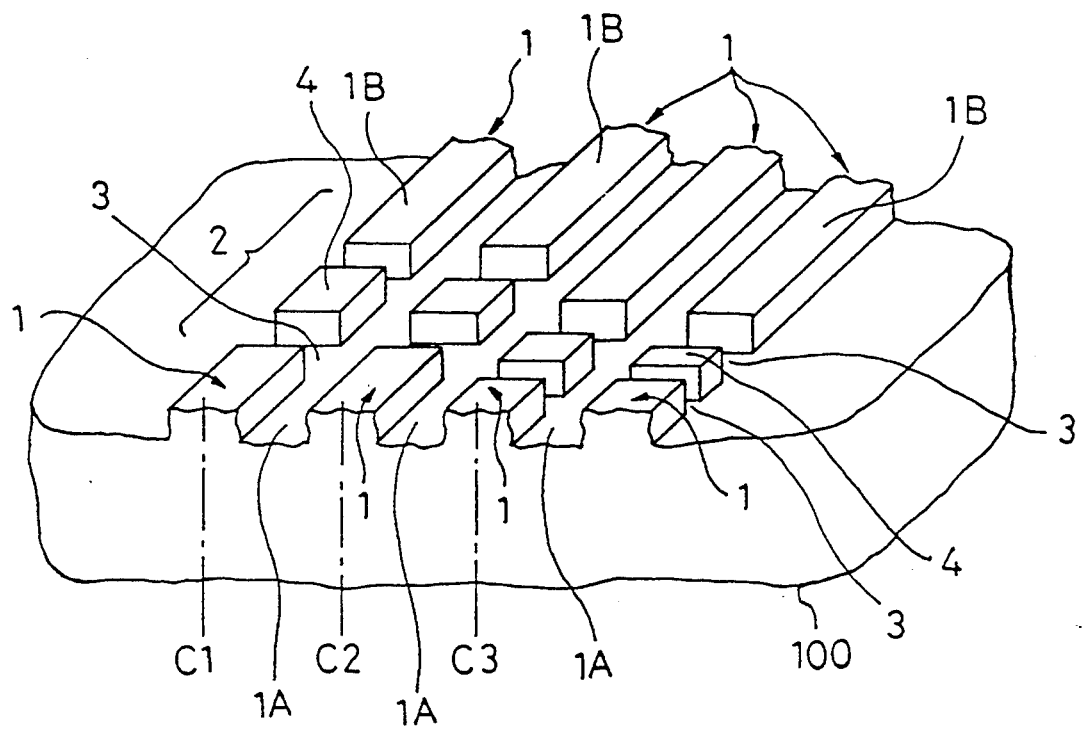
FIG. 34 is the enlarged fragmentary perspective view of the optical disk in the prior art.
Figure 35:
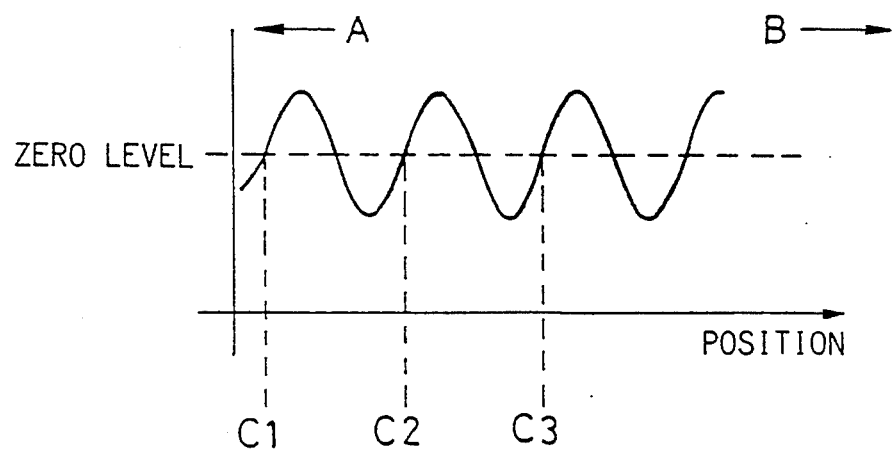
FIG. 35 is the diagram representing the tracking error signal in the prior art.

FIG. 33 is a block diagram of the tracking control apparatus of a twelfth embodiment of the present invention. In FIG. 33, components functioning in the same manner as in the arrangement of FIG. 7 are designated by like numerals as used with corresponding parts shown in FIG. 7 and therefore will not be described. In the twelfth embodiment, the light beam spot is controlled so as to position only on the groove track GT. The twelfth embodiment is similar to the third embodiment. However, an address readout circuit 903 in the twelfth embodiment is different from the address readout circuit 125 in the third embodiment in that a high level signal is applied to a determination circuit 905 in the state reproducing stably the address area. Moreover, a motor control circuit 904 is different from the motor control circuit 128 in FIG. 7 in that a high level signal is applied to a determination circuit 905 in a stable state in the revolution speed of the motor 101.

Configurations of the comparator 147 and the power source 148 are similar to those in the fourth embodiment shown in FIG. 11A. Therefore, when the light beam spot is controlled so as to position on the groove track GT, the output of the comparator 147 becomes a high level during a time period in which the light beam spot passes the address area. The output signal of the comparator 147 is generated on the basis of the tracking error signal. Moreover, the output of the gate signal generation circuit 123 is generated on the basis of the revolution speed of the motor 101 and the output of the address readout circuit 908 in a manner similar to the third embodiment.

A switch 902 outputs either output of the output signal of the comparator 147 and the output signal of the gate signal generation circuit 123. When the terminal "d" of the switch 902 is a high level, the terminal "c" is connected to the terminal "a", and when the terminal "d" is a low level, the terminal "c" is connected to the terminal "b". The terminal "d" of the switch 902 is connected to the determination circuit 905. In the determination circuit 905, a stabilized state in operation of the gate signal generation circuit 123 is determined, and a signal of a high level is output. When both the output signals of the motor control circuit 904 and the address readout circuit 903 are of high levels, the operation of the gate signal generation circuit 123 is determined to be stabilized. In an initial state, the revolution speed of the motor 101 is unstable, and hence the address cannot be stably reproduced by the address readout circuit 903. Therefore, the output of the determination circuit 905 is of a low level, and the output signal of the comparator 147 is output through the switch 902. Then, when the revolution speed of the motor 101 stabilizes and the address is stably reproduced by the address readout circuit 903, a signal of a high level representing stabilized state of the operation of the gate signal generation circuit 123 is output from the determination circuit 905 and is applied to the switch 902. The output of the switch 902 is changed to the output signal of the gate signal generation circuit 123.

The detection of the address area is performed on the basis of the tracking error signal in an initial state, and a predetermined time later, is performed on the basis of the output signal of the address readout circuit 903. Therefore, even if the output of the comparator 147 indicates erroneous detection of the address area due to noise, opening of the feedback loop of the tracking control system is presented. Moreover, when the intensity of the light source 105 is increased to record information on the disk, erroneous open of the feedback loop is also presented.

A jumping control circuit 901 starts a jumping operation of the light beam spot in compliance with the output signal of the switch 902 at reception of an instruction signal for Jumping to a neighboring track from the microcomputer 900. If the jumping operation is performed in the address area, the tracking control is unstable after the light beam spot have moved to the neighboring track because the tracking error signal has an offset. Therefore, the jumping operation is started by detecting a time at which the light beam spot have passed the address area on the basis of the output signal of the switch 902. Consequently, the jumping operation is performed in other area than the address area of which the tracking error signal includes the offset, and thus the tracking control is stable after the light beam spot have moved to the neighboring track.

What is claimed is:

1. A tracking control apparatus comprising:
disk rotating means for rotating a disk comprising groove tracks and land tracks for recording information and address area for recording an address disposed for each of said groove tracks and land tracks,
light beam spot producing means for emitting a light beam spot on a recording surface of said disk,
light beam spot moving means for moving said light beam spot to a direction traversing said groove track and land track,
light detecting means for detecting light reflected by or transmitted through said disk,
control signal deriving means for deriving a control signal corresponding to a positional deviation between said light beam spot and said groove track and between said light beam spot and said land track on the basis of the detected value of said light detecting means,
control means for controlling said light beam spot moving means on the basis of said control signal so that said light beam spot traces a target track,
address period signal generation means for generating an address period signal representing a time period tracing said address area with said light beam spot on the basis of the detected value of said light detecting means, and
polarity inverting means for inverting a polarity of said control signal in accordance with said address period signal in the case that said light beam spot traces said land track.

2. A tracking control apparatus comprising:
disk rotating means for rotating a disk comprising groove tracks and land tracks for recording information and address area for recording an address disposed for each of said groove tracks and land tracks,
light beam spot producing means for emitting a light beam spot on a recording surface of said disk,
light beam spot moving means for moving said light beam spot to a direction traversing said groove track and land tack,
light detecting means for detecting light reflected by or transmitted through said disk,
control signal deriving means for deriving a control signal corresponding to a positional deviation between said light beam spot and said groove track and between said light beam spot and said land track on the basis of the detected value of said light detecting means,
control means for controlling said light beam spot moving means on the basis of said control signal so that said light beam spot traces a target track,
address period signal generation means for generating an address period signal representing a time period tracing said address area with said light beam spot on the basis of the detected value of said light detecting means, and
signal holding means for holding said control signal during said address period represented by said address period signal.

3. A tracking control apparatus comprising:
disk rotating means for rotating a disk comprising groove tracks and land tracks for recording information and address area for recording an address disposed for each of said groove tracks and land tracks,
light beam spot producing means for emitting a light beam spot on a recording surface of said disk,
light beam spot moving means for moving said light beam spot to a direction traversing said groove track and land tack,
light detecting means for detecting light reflected by or transmitted through said disk,
control signal deriving means for deriving a control signal corresponding to a positional deviation between said light beam spot and said groove track and between said light beam spot and said land track on the basis of the detected value of said light detecting means,
control means for controlling said light beam spot moving means on the basis of said control signal so that said light beam spot traces a target track,
address period signal generation means for generating an address period signal representing a time period tracing said address area with said light beam spot on the basis of the detected value of said light detecting means, and
control signal suspending means for suspending inputting said control signal to said light beam spot moving means during said address period represented by said address period signal in tracing said land track by said light beam spot.

4. A tracking control apparatus comprising:
disk rotating means for rotating a disk comprising groove tracks and land tracks for recording information and a common address area for recording an address disposed for a pair of neighboring groove track and land track,
light beam spot producing means for emitting a light beam spot on a recording surface of said disk,
light beam spot moving means for moving said light beam spot to a direction traversing said groove track and land tack,
light detecting means for detecting light reflected by or transmitted through said disk,
control signal deriving means for deriving a control signal corresponding to a positional deviation between said light beam spot and said groove track and between said light beam spot and said land track on the basis of the detected value of said light detecting means,
control means for controlling said light beam spot moving means on the basis of said control signal so that said light beam spot traces a target track,
address period signal generation means for generating an address period signal representing a time period tracing said area with said light beam spot on the basis of the detected value of said light detecting means, and
signal holding means for holding said control signal during said address period represented by said address period signal.

5. A tracking control apparatus comprising:
disk rotating means for rotating a disk comprising groove tracks and land tracks for recording information and a common address area for recording an address disposed for a pair of neighboring groove track and land track, light beam spot producing means for emitting a light beam spot on a recording surface of said disk, light beam spot moving means for moving said light beam spot to a direction traversing said groove track and land tack, light detecting means for detecting light reflected by or transmitted through said disk, control signal deriving means for deriving a control signal corresponding to a positional deviation between said light beam spot and said groove track and between said light beam spot and said land track on the basis of the detected value of said light detecting means, control means for controlling said light beam spot moving means on the basis of said control signal so that said light beam spot traces a target track, address period signal generation means for generating an address period signal representing a time period tracing said area with said light beam spot on the basis of the detected value of said light detecting means, and control signal suspending means for suspending inputting said control signal to said light beam spot moving means during said address period represented by said address period signal in tracing said land track by said light beam spot.

6. A tracking control apparatus comprising:
disk rotating means for rotating a disk comprising groove tracks and land tracks for recording information and a common address area for recording an address disposed for a pair of neighboring groove track and land track, light beam spot producing means for emitting a light beam spot on a recording surface of said disk, light beam spot moving means for moving said light beam spot to a direction traversing said groove track and land tack, light detecting means for detecting light reflected by or transmitted through said disk, control signal deriving means for deriving a control signal corresponding to a positional deviation between said light beam spot and said groove track and between said light beam spot and said land track on the basis of the detected value of said light detecting means, control means for controlling said light beam spot moving means on the basis of said control signal so that said light beam spot traces a target track, address period signal generation means for generating an address period signal representing a time period tracing said area with said light beam spot on the basis of the detected value of said light detecting means, and jumping control means for controlling said light beam spot moving means so as to move said light beam spot to a neighboring track and being operated in a time period except for said address period represented by said address period signal.

7. A tracking control apparatus in accordance with claim 1, 2, 3, 4, 5 or 6, wherein
said address period signal generation means comprises address readout means for reading address information in the address area, and generates an address period signal on the basis of timing of readout by said address readout means.

8. A tracking control apparatus in accordance with claim 4, 5 or 6, wherein
said address period signal generation means generates the address period signal when the control signal output from said control signal detection means exceeds a predetermined reference level.

9. A tracking control apparatus in accordance with claim 4, 5 or 6, wherein
positional deviation detecting means for detecting a positional deviation between the light beam spot and a groove track or between the light beam spot and a land track by using a phase difference method is further comprised,
said address period signal generation means generates the address period signal when the output signal of said positional deviation detecting means exceeds a predetermined level.

10. A tracking control apparatus in accordance with claim 4, 5 or 6, wherein
said address period signal generations means outputs the address period signal having a predetermined time length from a rise edge to a fall edge of the control signal of said control signal detecting means, and comprises interruption means for interrupting the address period signal detected within a predetermined time period from the end of said address period signal.

11. A tracking control apparatus in accordance with claim 1, 2, 3, 4, 5 or 6, wherein
said address period signal generation means generates the address period signal when the intensity of entire reflected light or entire transmitted light from said disk exceeds a predetermined value.

12. A tracking control apparatus in accordance with claim 1, 2, 3, 4, 5 or 6, wherein
said address period signal generation means generates the address period signal on the basis of a value derived by detecting an alternating current component of the entire reflected light or the entire transmitted light from said disk.

13. A tracking control apparatus in accordance with claim 1, 2, 3, 4, 5 or 6, wherein
said address period signal generation means generates the address period signal on the basis of an detected output of a photodetector which detects the reflected light or transmitted light from said disk and detects an alternating current component of a signal corresponding to a difference of outputs between plural light sensing parts divided into both along the length of said track and in the perpendicular direction thereof.

14. A tracking control apparatus in accordance with claim 8, wherein
said address period signal generation means changes the level of the control signal in tracking said groove track with respect to the level of the control signal in tracking said land track.

15. A tracking control apparatus in accordance with claim 8, wherein
said address period signal generation means comprises means for inverting the polarity of the control signal in tracking said groove track with respect to the polarity of the control signal in tracking said land track.

16. A tracking control apparatus in accordance with claim 9, wherein
said address period signal generation means inverts the polarity of the output signal of said positional deviation detecting means in tracking of said groove track with respect to the polarity of the output signal of said positional deviation detecting means in tracking of said land track.

17. A tracking control apparatus in accordance with claim 2 or 4, wherein said holding means suspends to hold the control signal from said control signal detection means during a predetermined time period after start of operation of said control signal detection means.

18. A tracking control apparatus in accordance with claim 3 or 5, wherein said control signal detection means applies said control signal of said control signal detection means to said light beam spot moving means during a predetermined time period after start of operation.

19. A tracking control apparatus in accordance with claim 9, wherein said address period signal generation means changes the level of the output signal of said positional deviation detecting means in tracking of said groove track with respect to the level of the output signal of said positional deviation detecting means in tracking of said land track.

* * * * *